United States Patent
Okubo

(10) Patent No.: US 8,736,973 B2
(45) Date of Patent: May 27, 2014

(54) ZOOM LENS AND IMAGE PICKUP APPARATUS EQUIPPED WITH ZOOM LENS

(75) Inventor: Yosuke Okubo, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/470,603

(22) Filed: May 14, 2012

(65) Prior Publication Data

US 2012/0300113 A1    Nov. 29, 2012

(30) Foreign Application Priority Data

May 23, 2011   (JP) ................. 2011-114802

(51) Int. Cl.
*G02B 15/177*   (2006.01)
*G02B 13/02*   (2006.01)

(52) U.S. Cl.
USPC ............................ 359/689; 359/745; 359/748

(58) Field of Classification Search
USPC ................... 359/686, 689, 695, 779
See application file for complete search history.

(56) References Cited

U.S. PATENT DOCUMENTS

| | | | |
|---|---|---|---|
| 6,124,984 A | 9/2000 | Shibayama et al. | |
| 8,559,116 B2* | 10/2013 | Bito et al. | 359/682 |
| 2006/0132929 A1* | 6/2006 | Ito | 359/689 |

FOREIGN PATENT DOCUMENTS

JP   2007108531 A   4/2007

* cited by examiner

*Primary Examiner* — Evelyn A Lester
*Assistant Examiner* — William Alexander
(74) *Attorney, Agent, or Firm* — Canon USA Inc. IP Division

(57) ABSTRACT

A zoom lens includes, in order from an object side to an image side, a first lens unit of a negative refractive power, a second lens unit of a positive refractive power, and a third lens unit of a positive refractive power, each lens unit being moved during zooming, wherein the second lens unit includes two positive lenses, a negative lens, a positive lens in order from the object side to the image side, and an average refractive index Nd2*p* for d-line of materials of the positive lenses in the second lens unit and a refractive index Nd2*n* for d-line of a material of the negative lens in the second lens unit are appropriately set.

17 Claims, 29 Drawing Sheets

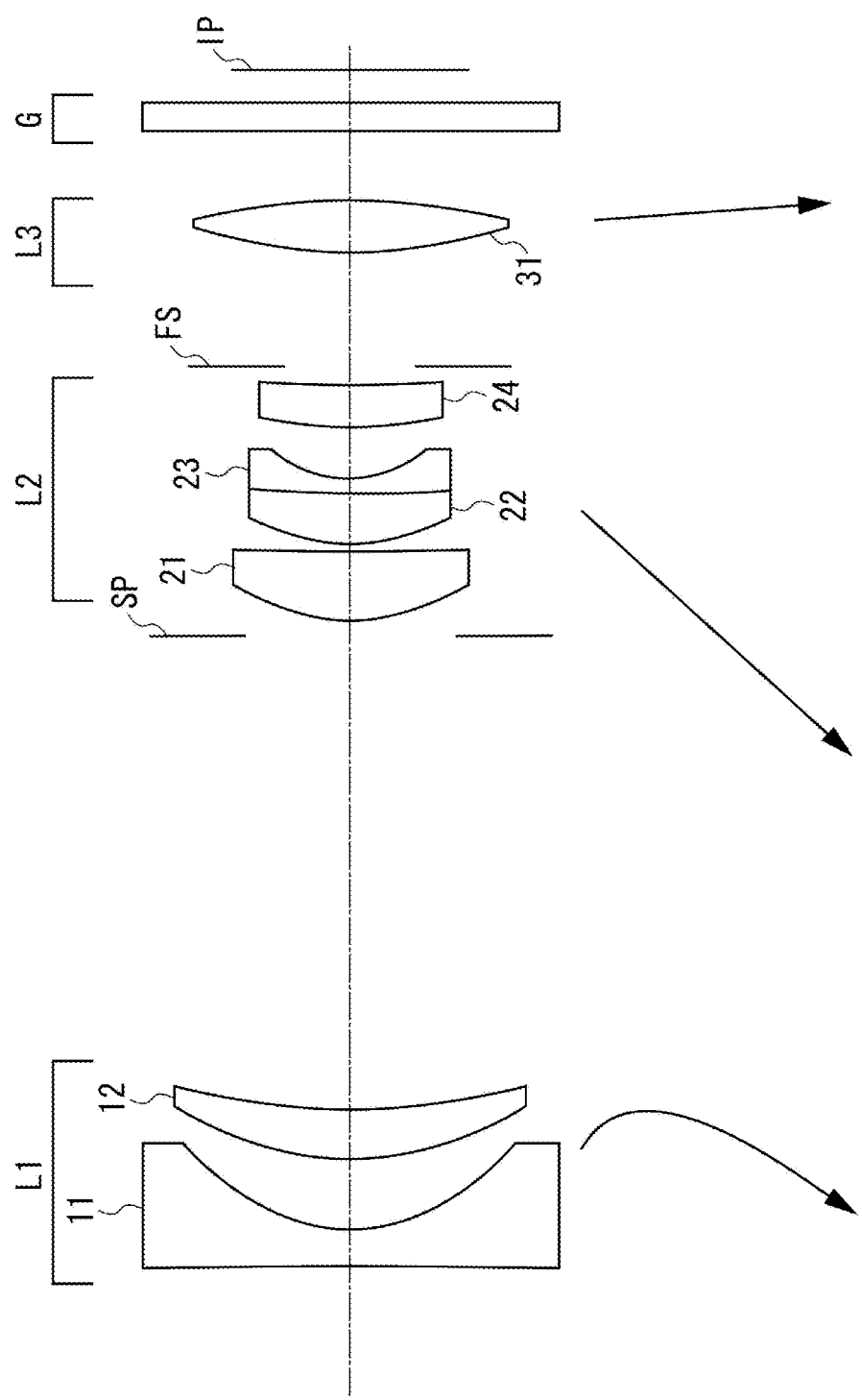

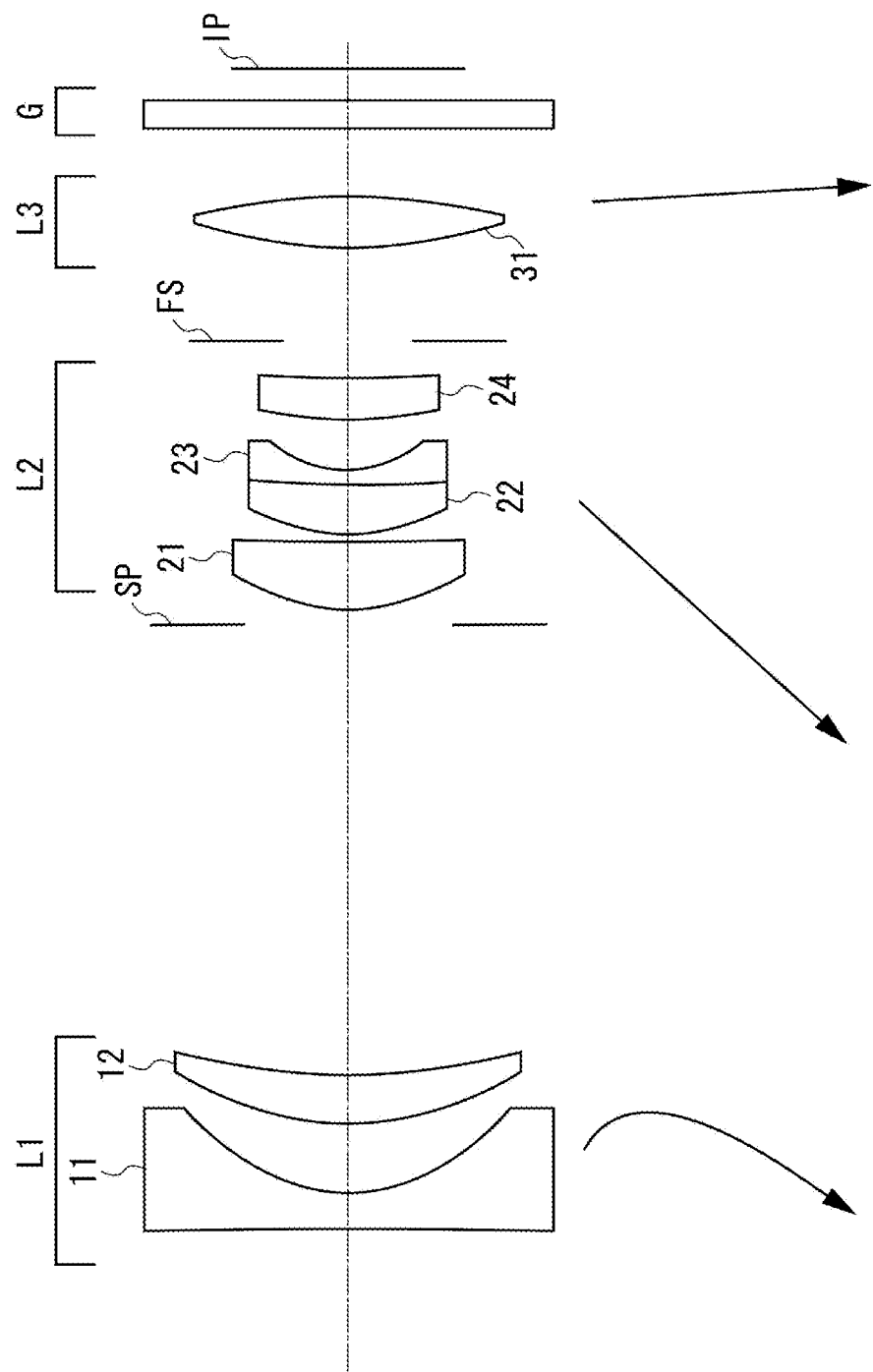

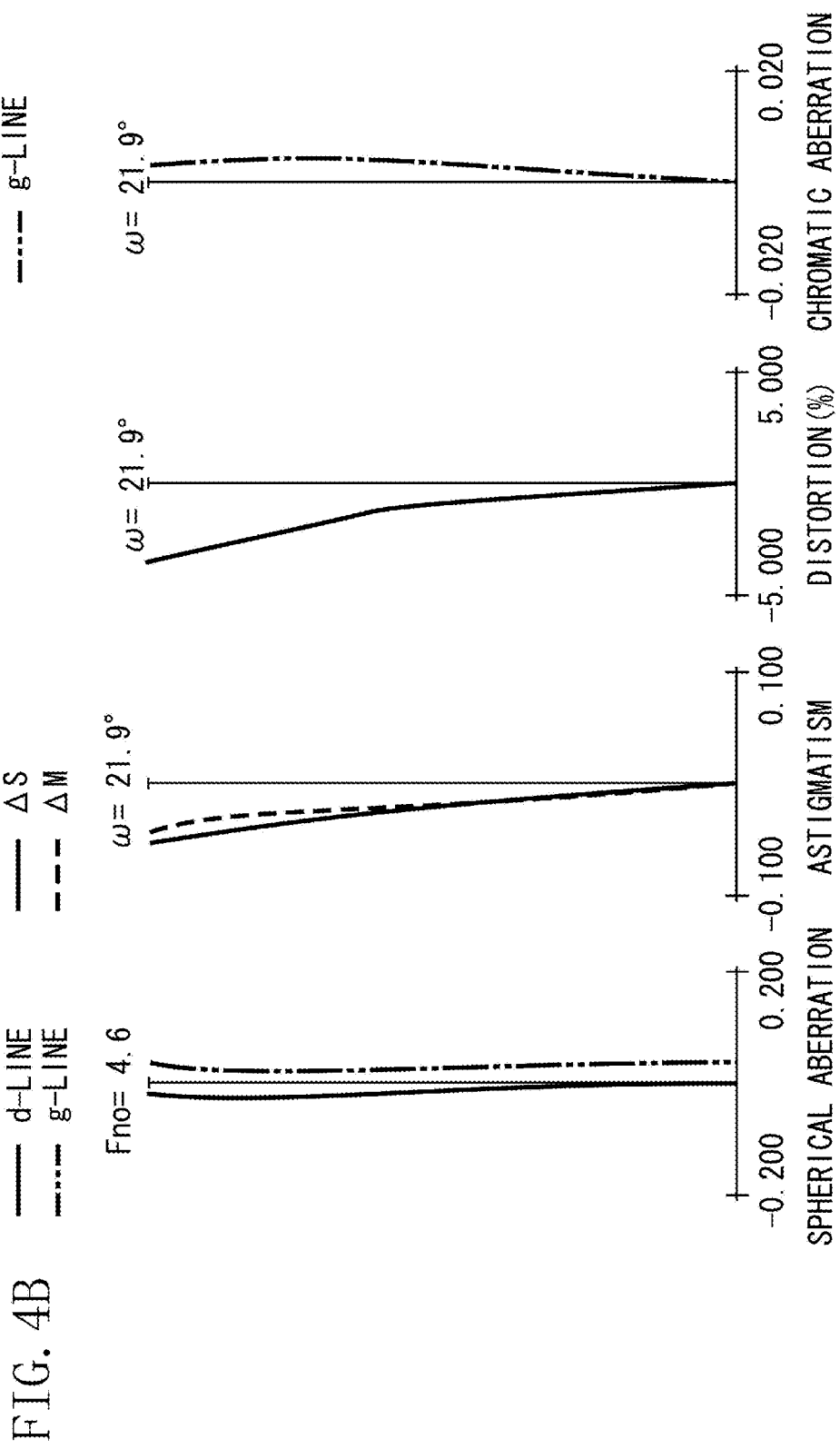

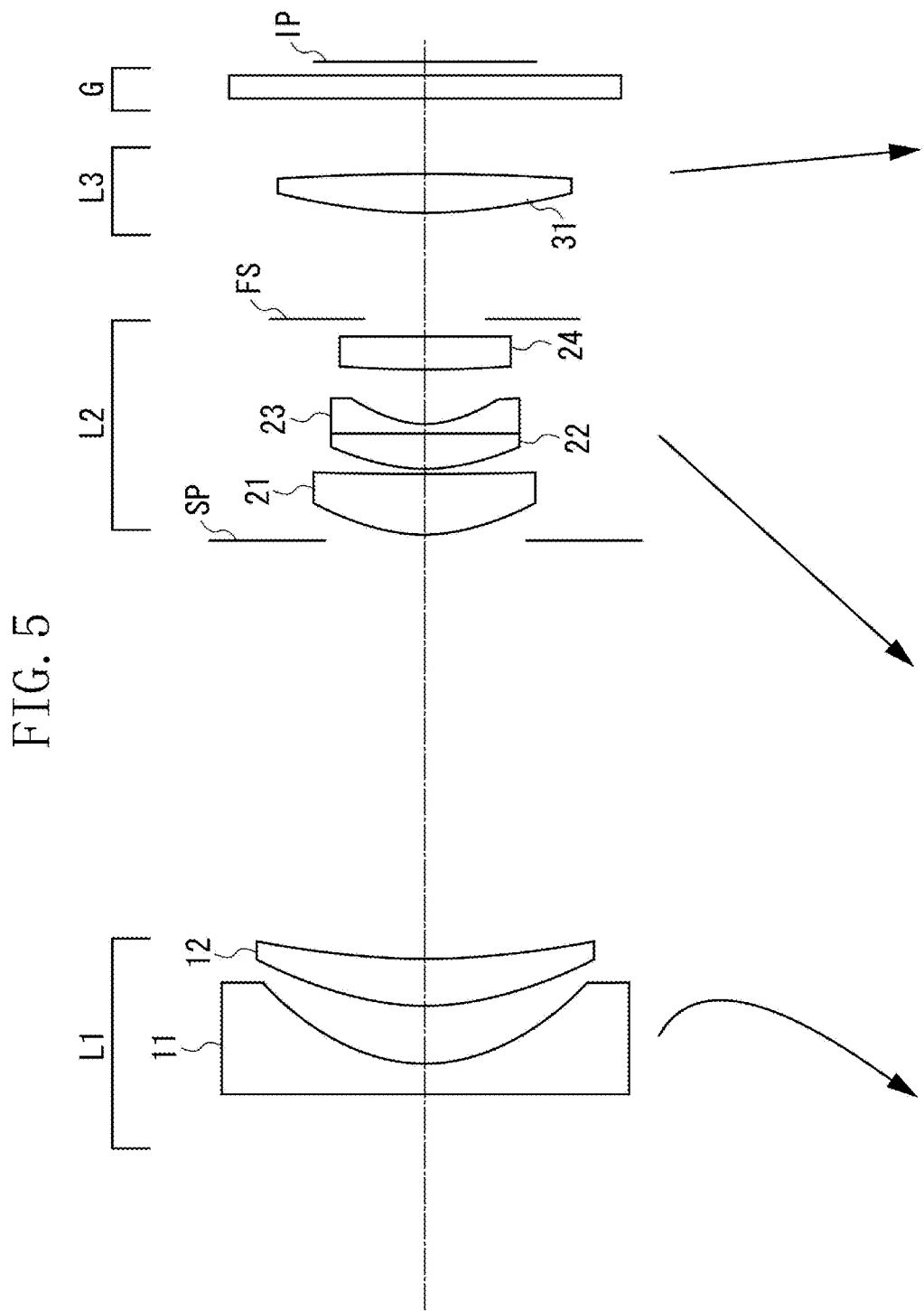

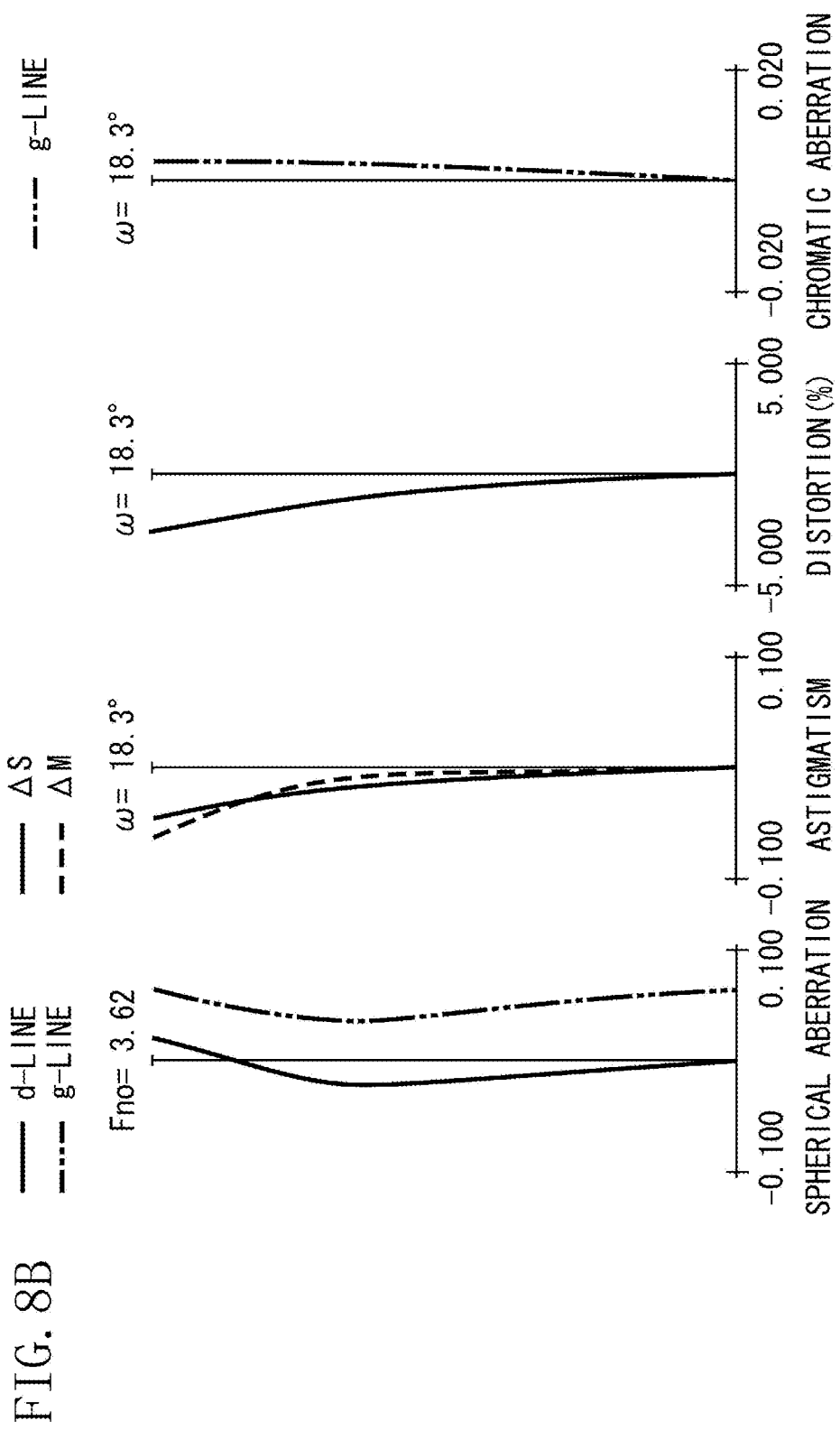

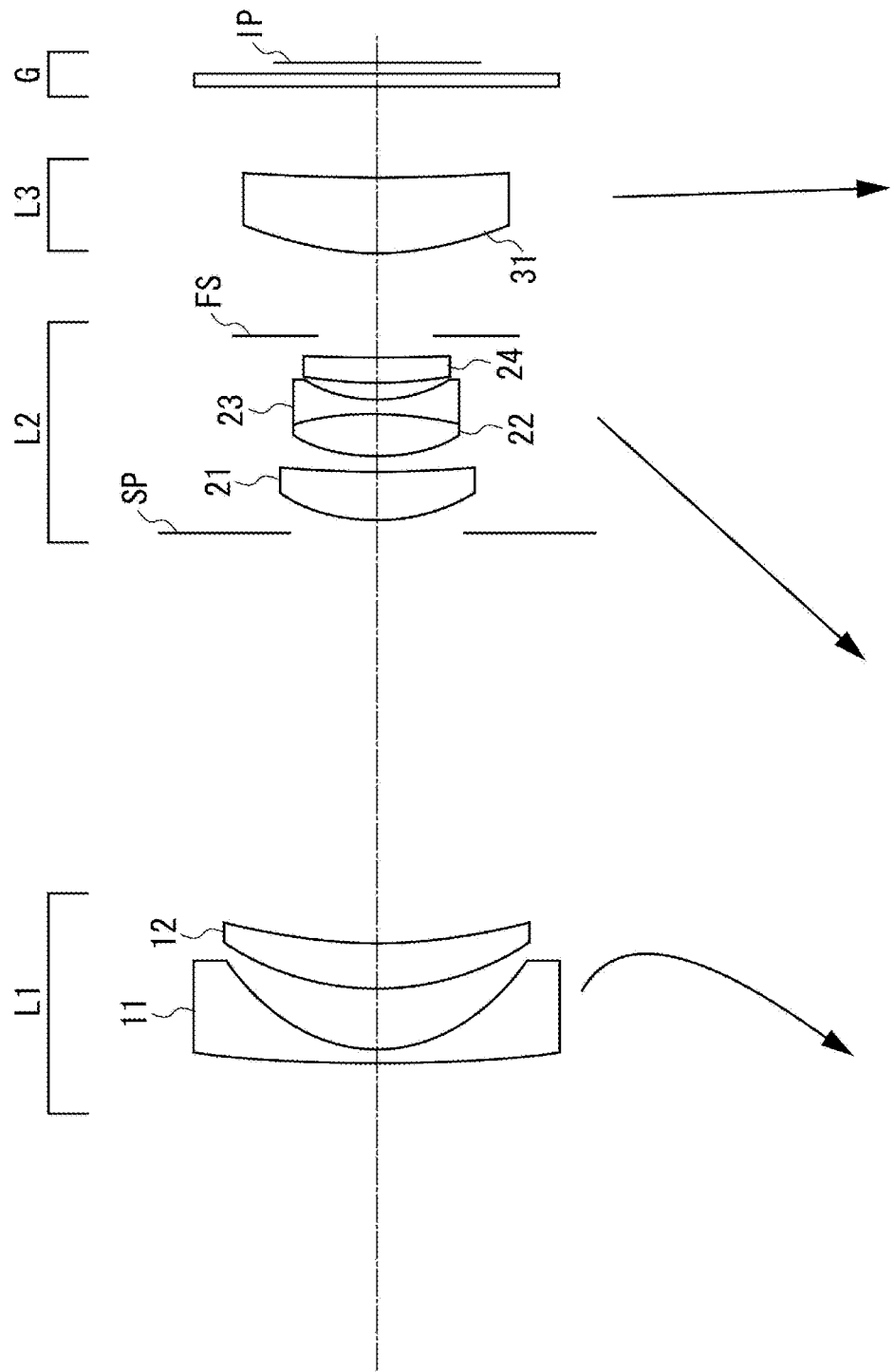

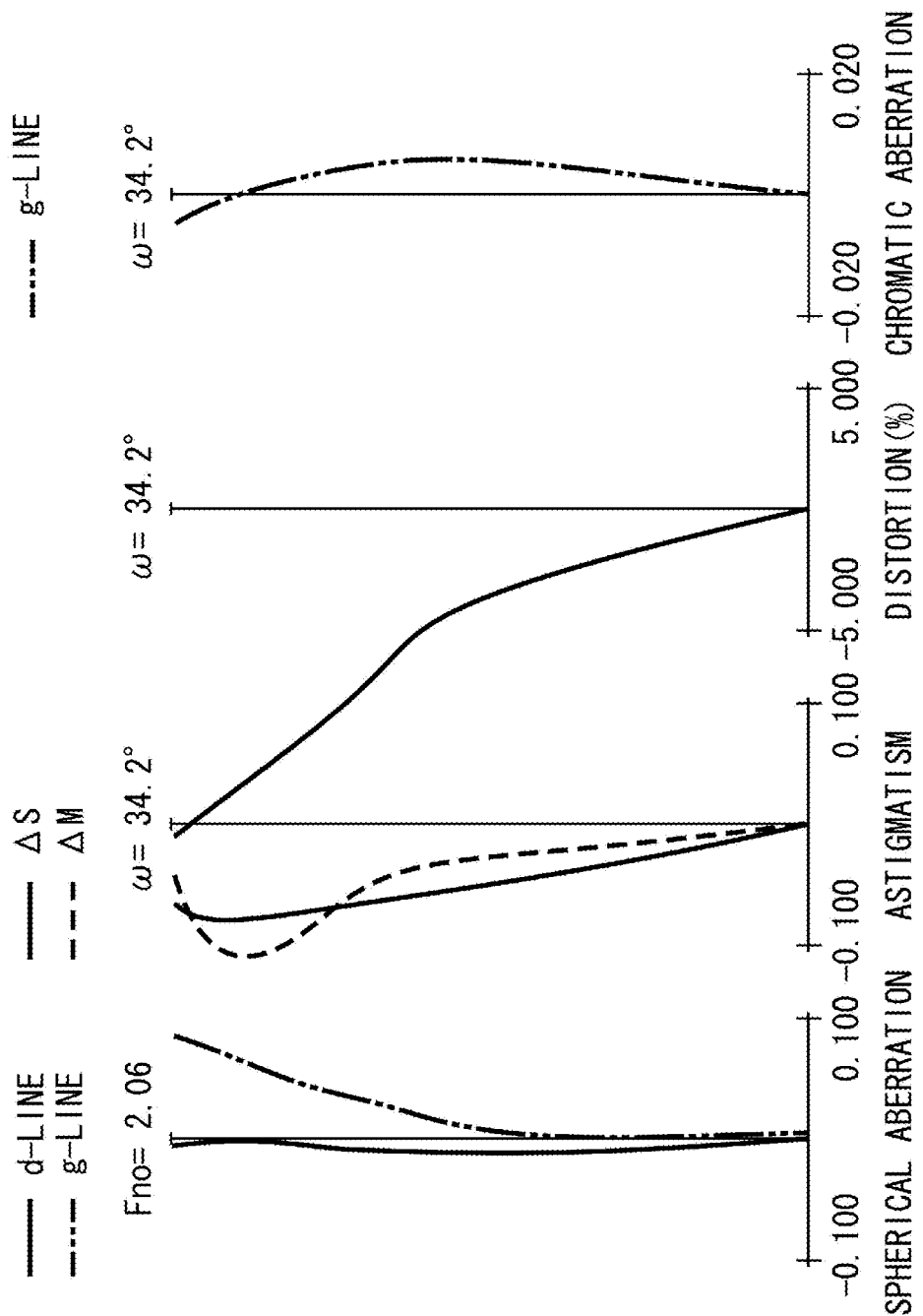

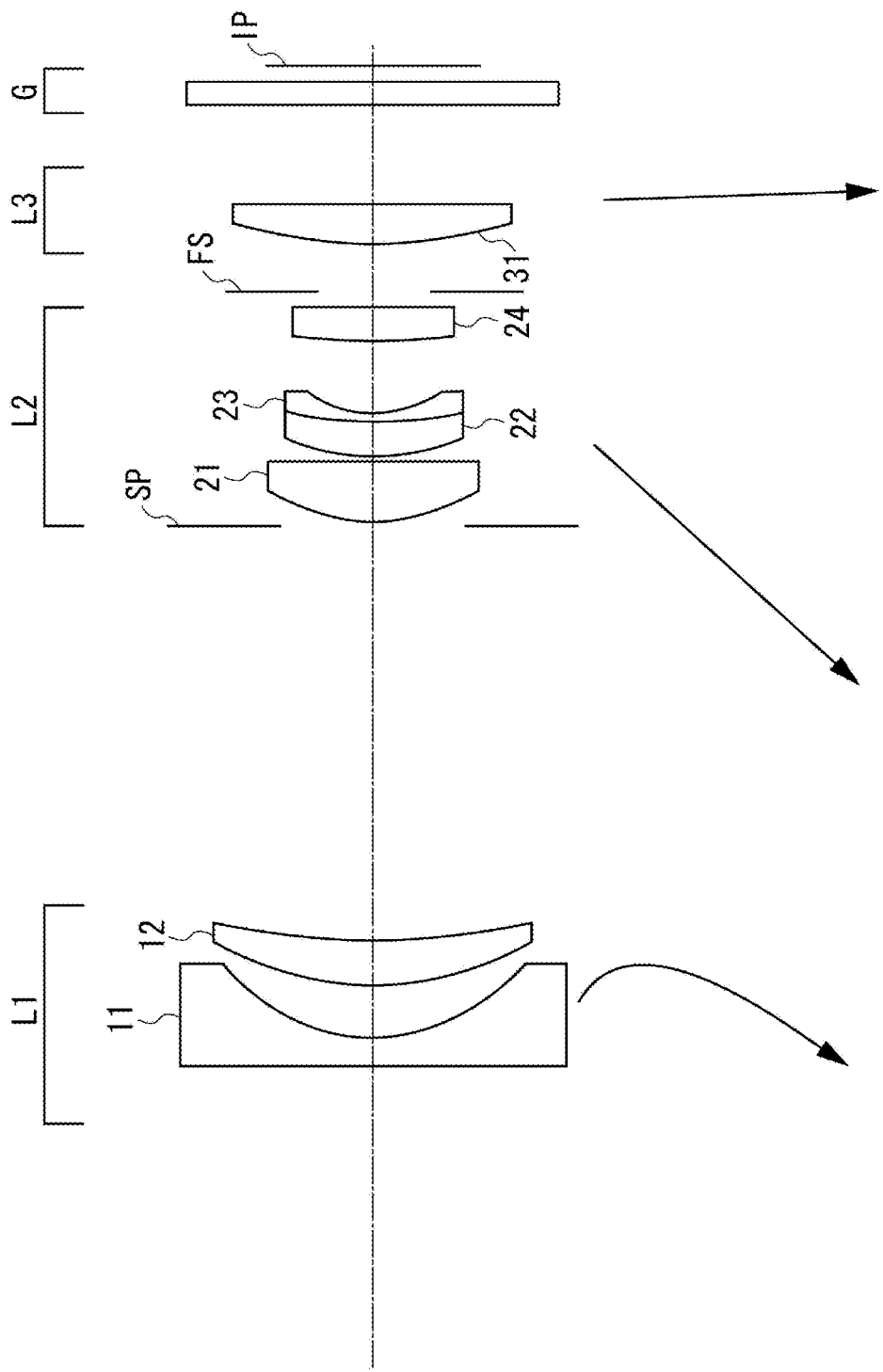

ZOOM LENS AND IMAGE PICKUP APPARATUS EQUIPPED WITH ZOOM LENS

BACKGROUND OF THE INVENTION

1. Field of the Invention

The present invention relates to a zoom lens, and more particularly, to a zoom lens suitable for use in an image pickup apparatus such as a digital camera, a video camera, a TV camera, and a monitoring camera.

2. Description of the Related Art

In recent years, an image pickup apparatus such as a video camera and a digital camera using a solid-state image sensor has been miniaturized while maintaining a high functionality. In addition, as the image pickup apparatus is miniaturized with a high functionality, an optical system used therein is required to be a miniaturized zoom lens having excellent optical performance such as a wide angle of view, a high zoom ratio, and a high aperture ratio. Furthermore, there is a demand for a retractable zoom lens in which a projected length of the lens from the camera body is reduced by retracting each lens unit up to a distance different from that of the imaging state when it is not used in order to obtain a compact camera and a high zoom ratio of the zoom lens.

As a zoom lens with a miniaturized entire zoom lens, a wide angle of view and a high zoom ratio, there is known a negative lead type zoom lens in which a lens unit of a negative refractive power is closest to an object side. As the negative lead type zoom lens, there is known a three-unit zoom lens including a first lens unit of a negative refractive power, a second lens unit of a positive refractive power, and a third lens unit of a positive refractive power in order from an object side to an image side (refer to Japanese Patent Application Laid-open No. 2007-108531 and U.S. Pat. No. 6,124,984).

In order to obtain miniaturization of the entire zoom lens and maintain the high zoom ratio in the negative lead type three-unit zoom lens, it is effective to increase the refractive powers of each lens unit of the zoom lens. In addition, in order to obtain a compact image pickup apparatus, it is effective to use the retractable zoom lens in which a projected length of the lens from the camera body is reduced by retracting each lens unit up to a distance different from that of the imaging state when it is not used. However, for example, if the refractive powers of each lens unit are simply strengthened to obtain a wide angle of view and a high zoom ratio and miniaturize the entire zoom lens, a variation of aberration caused by zooming increases so that it is difficult to obtain excellent optical performance across the entire zoom range.

Moreover, if the movement amounts of each lens unit for zooming and focusing increase, the entire lens length increases accordingly so that a complicated lens barrel configuration is necessary to obtain a desired retraction length. In general, since the movement amount of each lens unit strongly relates to the zoom ratio, such a tendency becomes significant as the zoom ratio increases. In addition, in order to obtain a high aperture ratio, a lens unit having an aperture stop becomes large-sized, and a diameter of a marginal ray increases. As a result, a significant number of unnecessary beams are incident to the image plane so that optical performance is degraded. For this reason, it is necessary to provide a countermeasure to sufficiently correct aberration such as increasing the number of lenses.

If the number of lenses of each lens unit increases, the entire lens length for retraction increases so that it is difficult to miniaturize a camera. For this reason, in the negative lead type three-unit zoom lens, it is important to appropriately set configurations of each lens unit in order to obtain a desired retraction length while the entire zoom lens is miniaturized with a wide angle of view and a high zoom ratio. For example, if a wide angle of view and a high zoom ratio are obtained without appropriately setting a configuration or a refractive power of the second lens unit, it is difficult to obtain excellent optical performance. In addition, the entire zoom lens becomes large-sized.

Although Japanese Patent Application Laid-open No. 2007-108531 described above provides a zoom lens having a focal length of about 36 mm and a zoom ratio of about 3.0 in the case of a 35 mm silver-halide film camera, the capturing angle of view is not a wide angle of view, and the zoom ratio is not sufficient. In addition, although U.S. Pat. No. 6,124,984 proposes a zoom lens having an F-number of 2.7, the image-side lens unit is large-sized due to an aperture stop, an aperture ratio is not negligible and brightness is not sufficient.

SUMMARY OF THE INVENTION

Aspects of the present invention are directed to a zoom lens capable of obtaining excellent optical performance with a wide angle of view and a high zoom ratio across the entire zoom range while the entire zoom lens is compact, and an image pickup apparatus equipped with the zoom lens.

According to an aspect of the present invention, a zoom lens includes, in order from an object side to an image side, a first lens unit of a negative refractive power, a second lens unit of a positive refractive power, and a third lens unit of a positive refractive power, each lens unit being moved during zooming, wherein the second lens unit includes two positive lenses, a negative lens, and a positive lens in order from the object side to the image side, and the following conditions are satisfied:

$$1.73 < Nd2p < 1.92 \text{ and}$$

$$1.90 < Nd2n < 2.40,$$

where $Nd2p$ denotes an average refractive index for d-line of materials of the positive lenses in the second lens unit, and $Nd2n$ denotes a refractive index for d-line of a material of the negative lens in the second lens unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a lens cross-sectional view illustrating a zoom lens according to a first embodiment of the invention at the wide-angle end.

FIG. 3 is a lens cross-sectional view illustrating a zoom lens according to a second embodiment of the invention at the wide-angle end.

FIGS. 4A, 4B, and 4C are aberration charts of the zoom lens according to the second embodiment of the invention at the wide-angle end, the middle zoom position, and the telephoto end, respectively.

FIG. 5 is a lens cross-sectional view illustrating a zoom lens according to a third embodiment of the invention at the wide-angle end.

FIGS. 8A, 8B, and 8C are aberration charts of the zoom lens according to the fourth embodiment of the invention at the wide-angle end, the middle zoom position, and the telephoto end, respectively.

FIG. 9 is a lens cross-sectional view illustrating a zoom lens according to a fifth embodiment of the invention at the wide-angle end.

FIGS. 10A, 10B, and 10C are aberration charts of the zoom lens according to the fifth embodiment of the invention at the wide-angle end, the middle zoom position, and the telephoto end, respectively.

FIG. 11 is a lens cross-sectional view illustrating a zoom lens according to a sixth embodiment of the invention at the wide-angle end.

DESCRIPTION OF THE EMBODIMENTS

Various exemplary embodiments, features, and aspects of the invention will be described in detail below with reference to the drawings.

A zoom lens according to an exemplary embodiment of the invention is a negative lead type zoom lens including a first lens unit of a negative refractive power, a second lens unit of a positive refractive power, and a third lens unit of a positive refractive power in order from an object side to an image side, in which each lens unit is moved during zooming.

The zoom lens according to an exemplary embodiment of the invention is a negative lead type, which is advantageous in a wide angle of view and miniaturization. In addition, in order to obtain a high zoom lens, a three-unit configuration including lens units of negative, positive, and positive refractive powers. In particular, a high-refractive glass material is used in the lens of the second lens unit L2 to achieve miniaturization of a high aperture ratio. For the increasing spherical aberration due to a large aperture, curvature of the lens is reduced, and an increase of spherical aberration is suppressed by using a high-refractive material.

In addition, generation of spherical aberration or coma is suppressed by arranging two or more positive lenses closer to the object side than the negative lens of the second lens unit L2 and reducing a refractive angle of the ray so that excellent optical performance is obtained with a high aperture ratio.

Figure 2A:
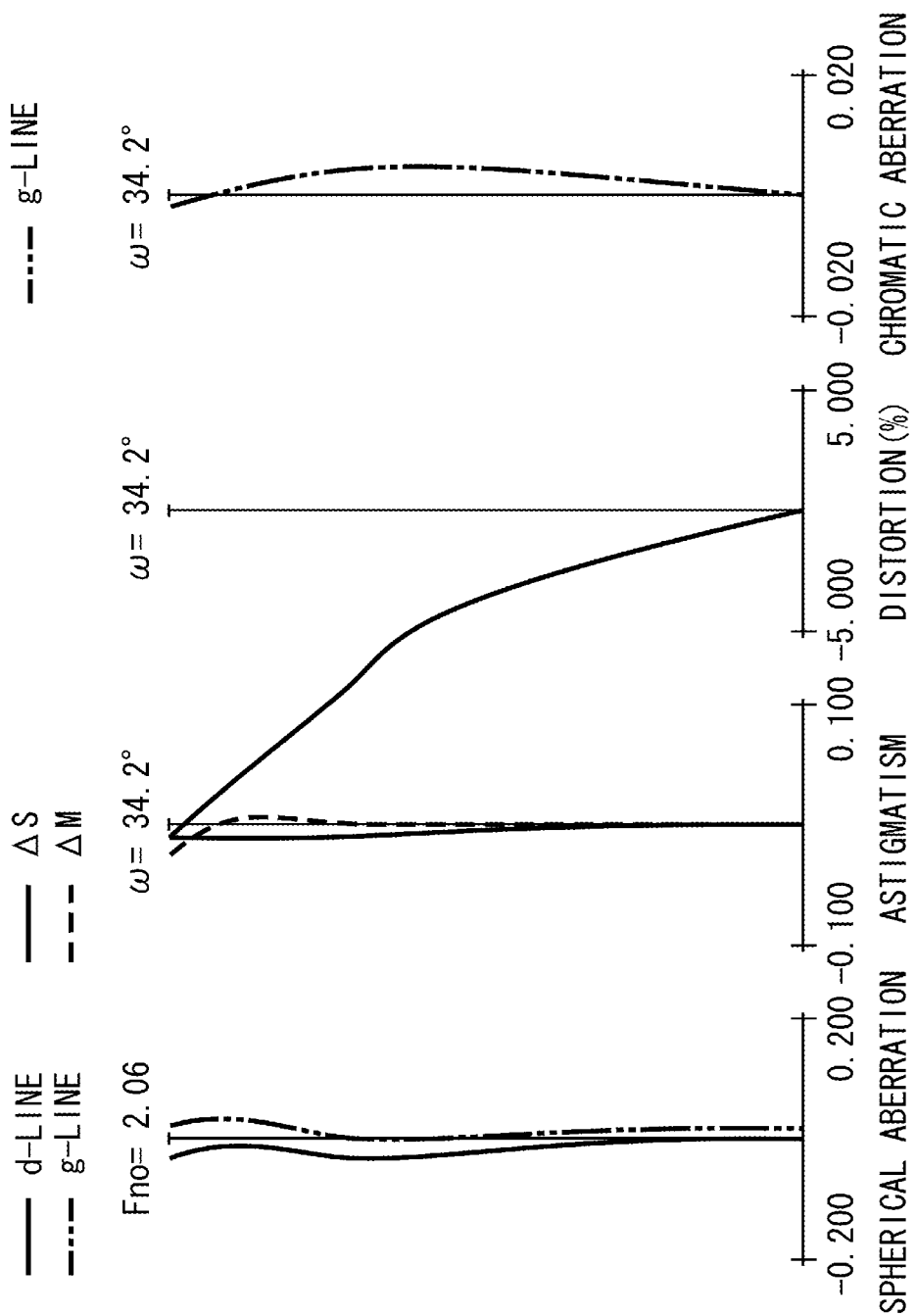
FIGS. 2A, 2B, and 2C are aberration charts of the zoom lens according to the first embodiment at the wide-angle end, the middle zoom position, and the telephoto end, respectively.
Figure 2B:
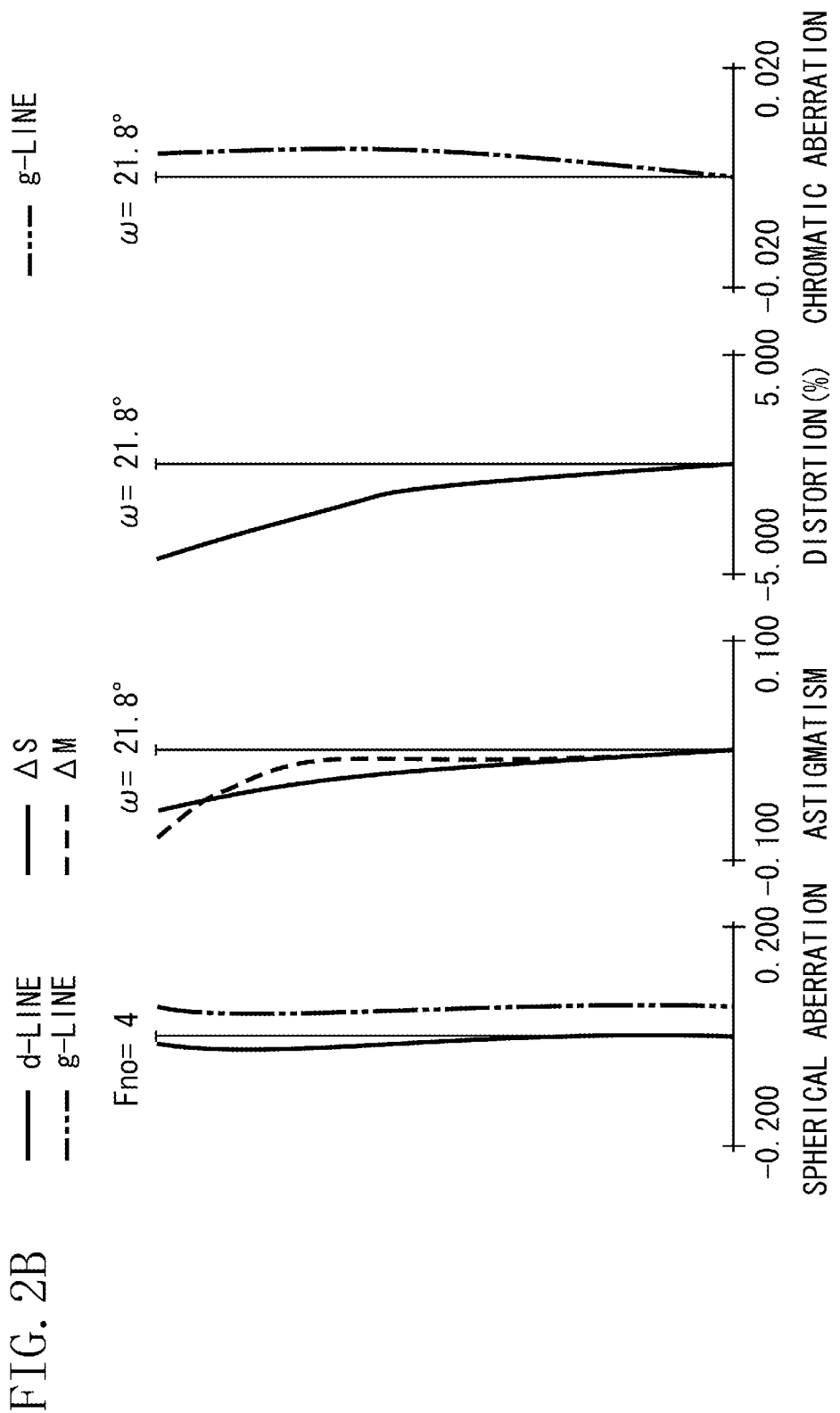
Figure 2C:
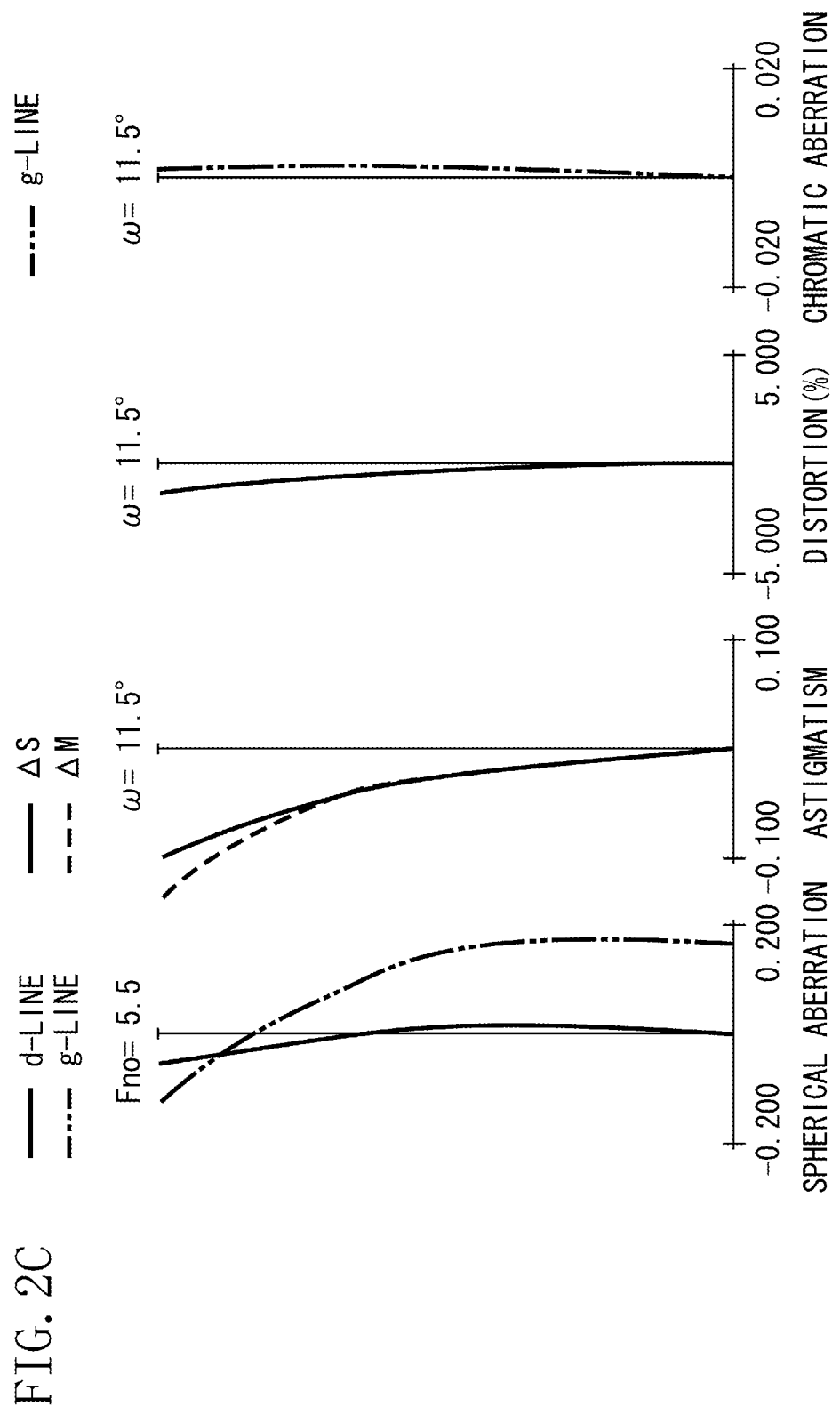
Figure 4A:
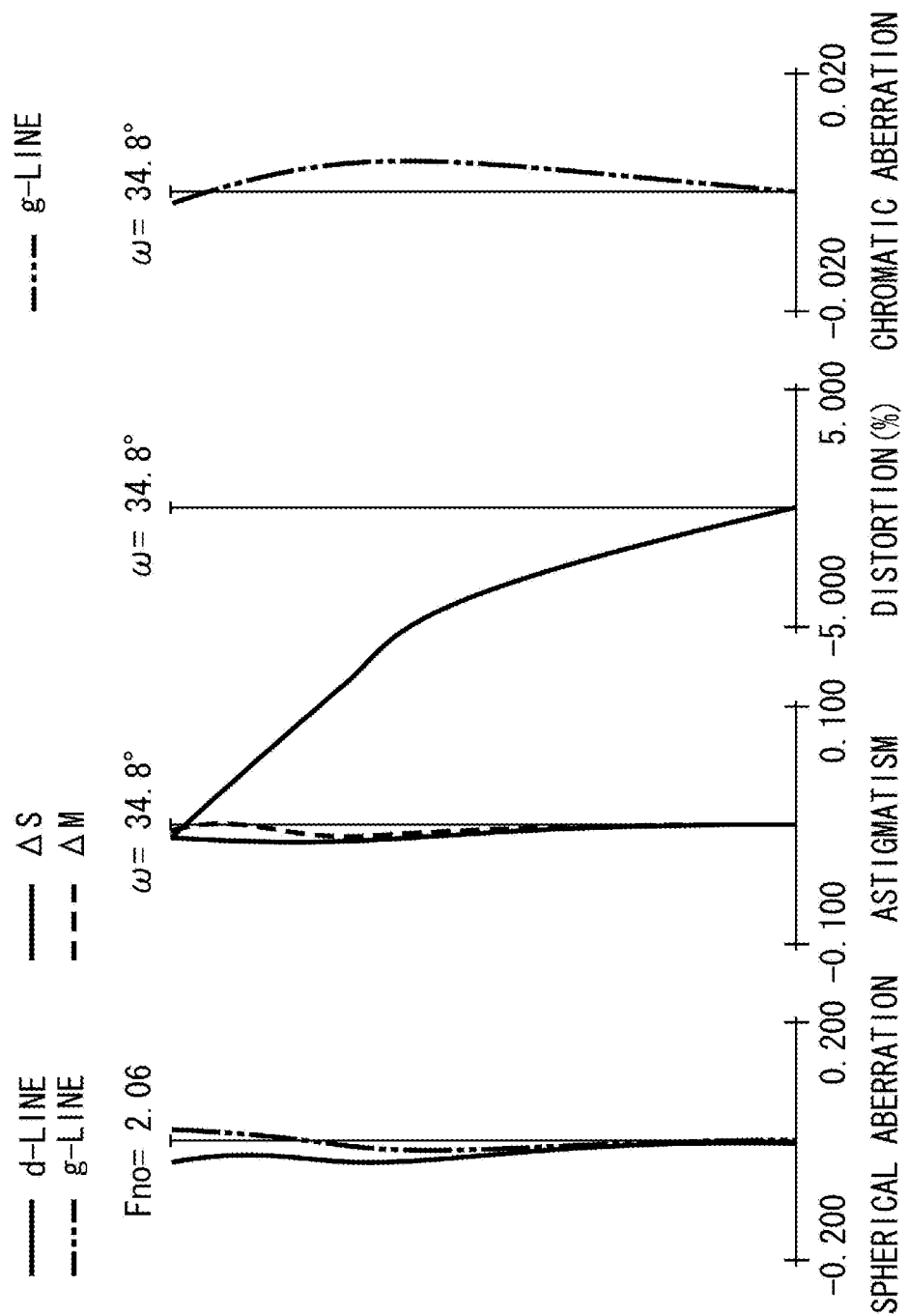
Figure 4C:
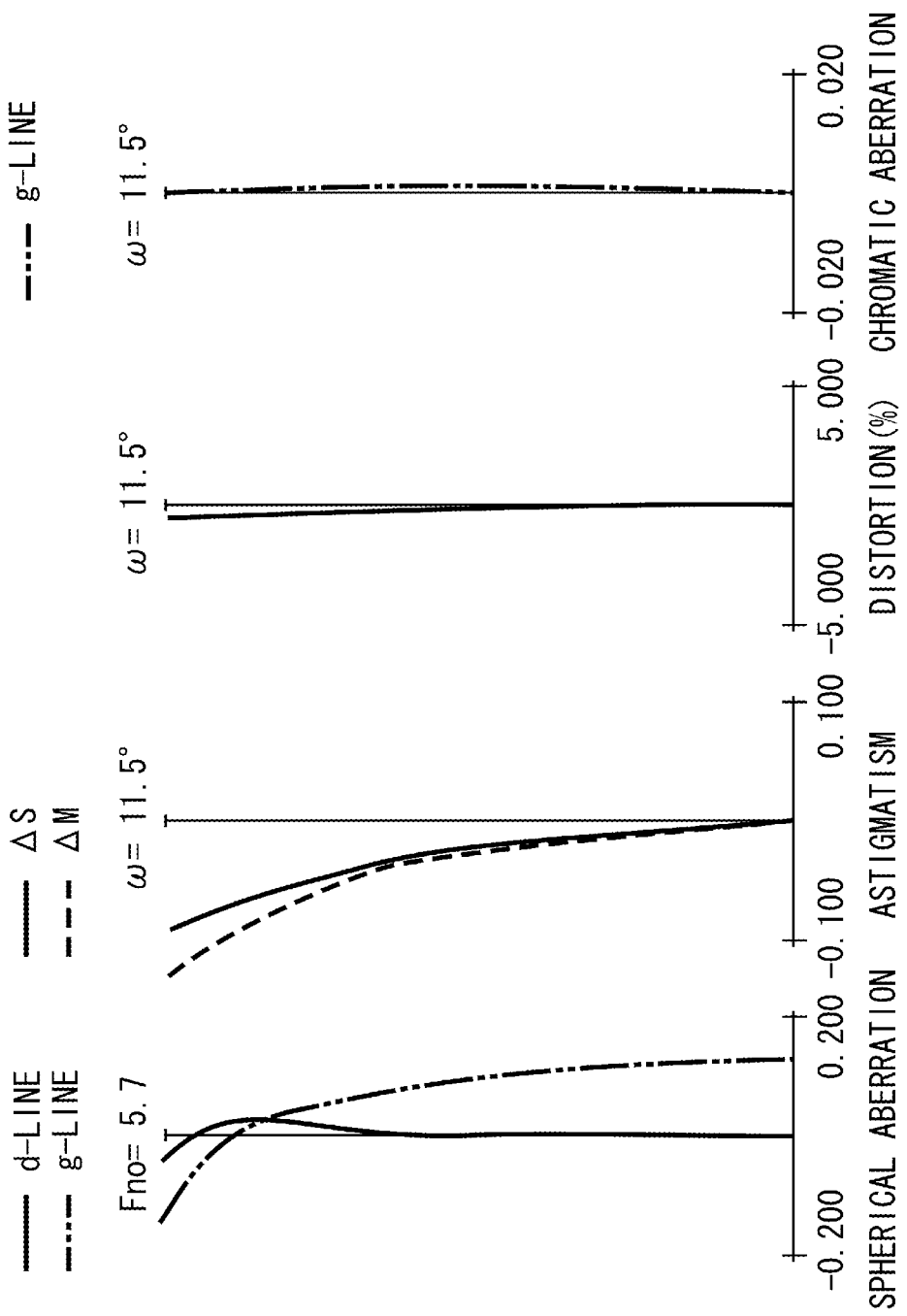

FIG. 1 is a lens cross-sectional view illustrating a zoom lens according to the first embodiment at the wide-angle end. FIGS. 2A, 2B, and 2C are aberration charts of the zoom lens according to the first embodiment at the wide-angle end, the middle focal length, and the telephoto end, respectively. The first embodiment relates to a zoom lens having a zoom ratio of 3.8 and an aperture ratio of 2.1 to 5.1. FIG. 3 is a cross-sectional view illustrating the zoom lens according to the second embodiment at the wide-angle end. FIGS. 4A, 4B, and 4C are aberration charts of the zoom lens according to the second embodiment at the wide-angle end, the middle focal length, and the telephoto end, respectively. The second embodiment relates to a zoom lens having a zoom ratio of 3.9 and an aperture ratio of 2.1 to 5.7.

Figure 6A:
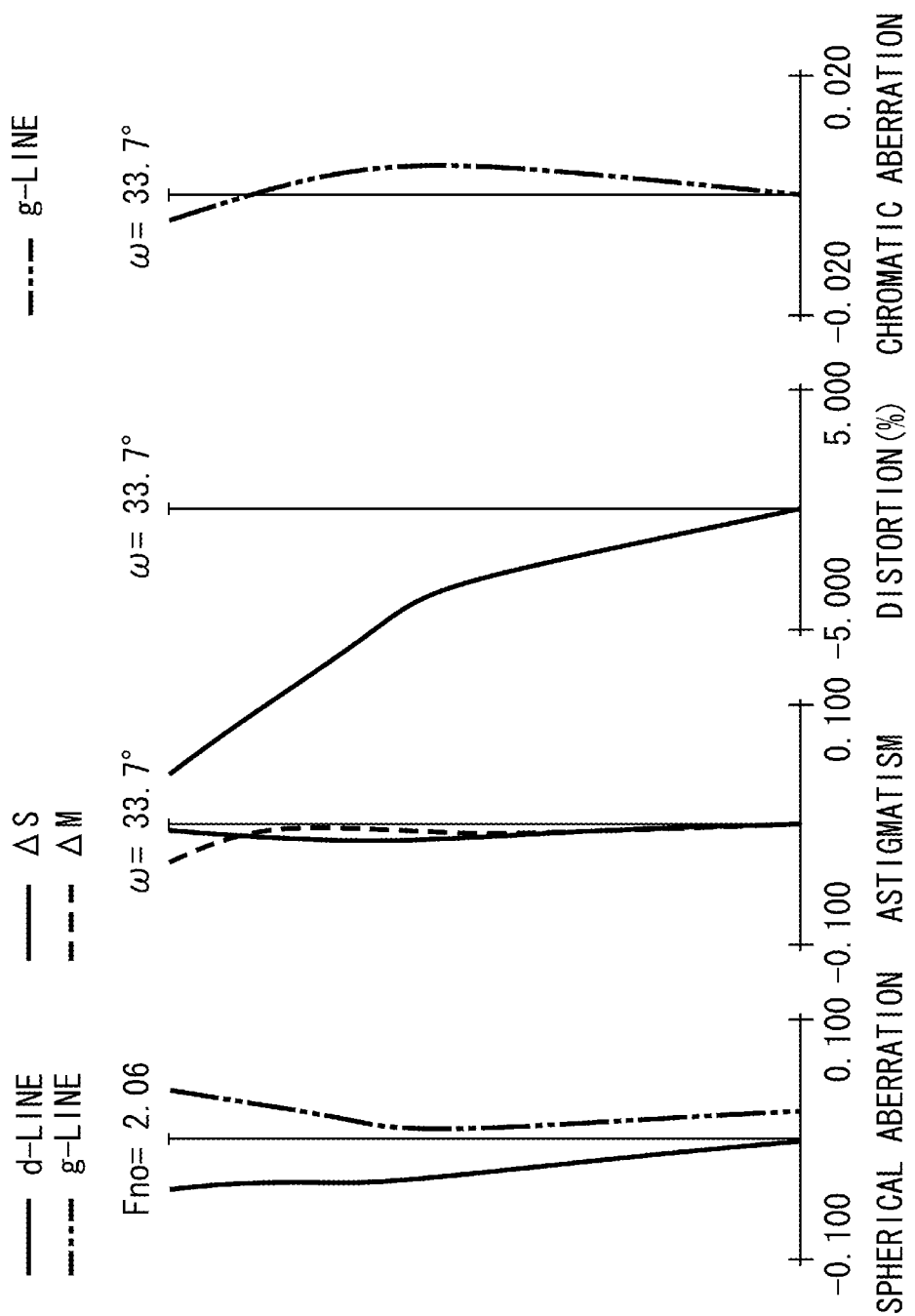
FIGS. 6A, 6B, and 6C are aberration charts of the zoom lens according to the third embodiment of the invention at the wide-angle end, the middle zoom position, and the telephoto end, respectively.
Figure 6B:
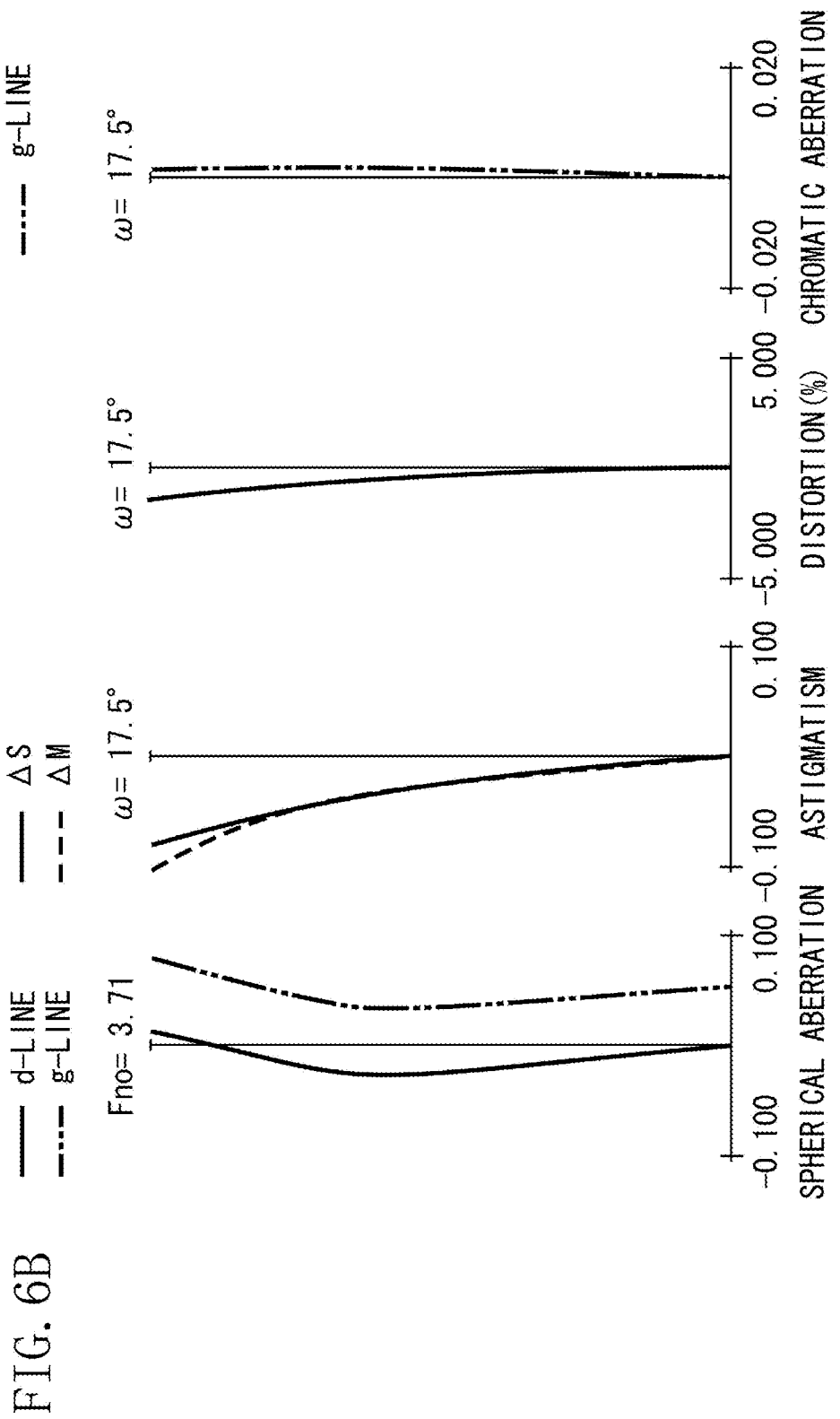
Figure 6C:
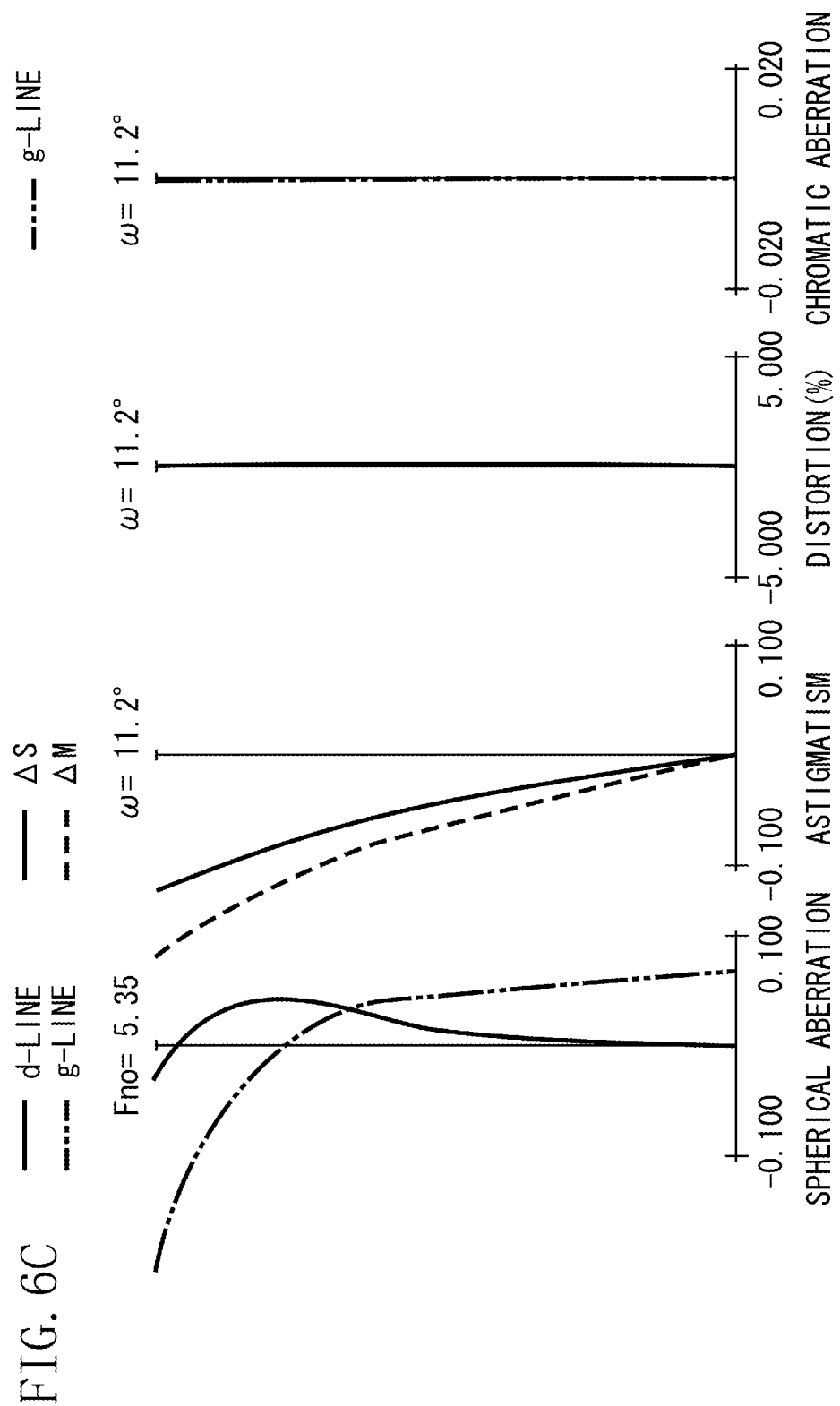
Figure 7:
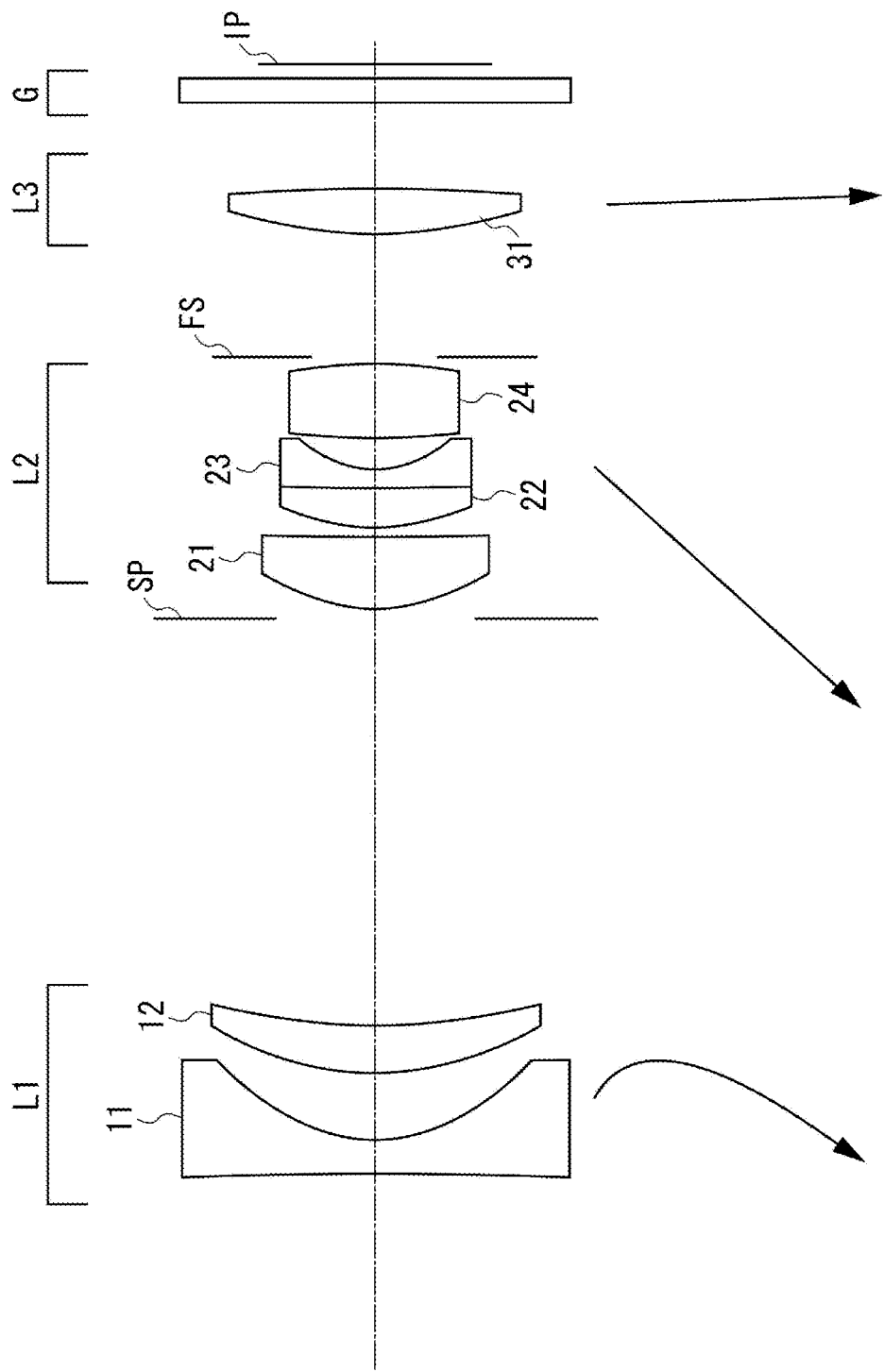
FIG. 7 is a lens cross-sectional view illustrating a zoom lens according to a fourth embodiment of the invention at the wide-angle end.
Figure 8A:
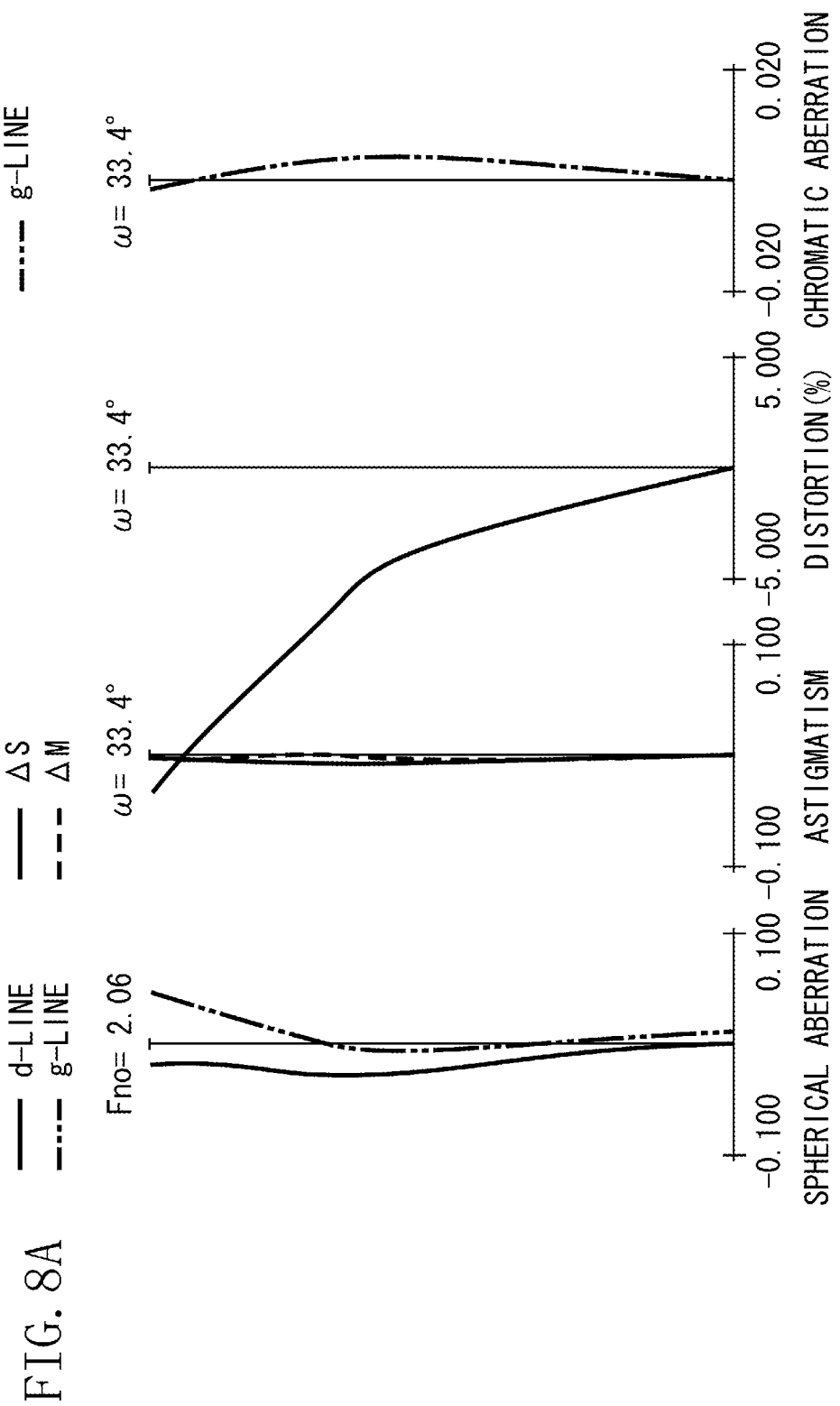
Figure 8C:
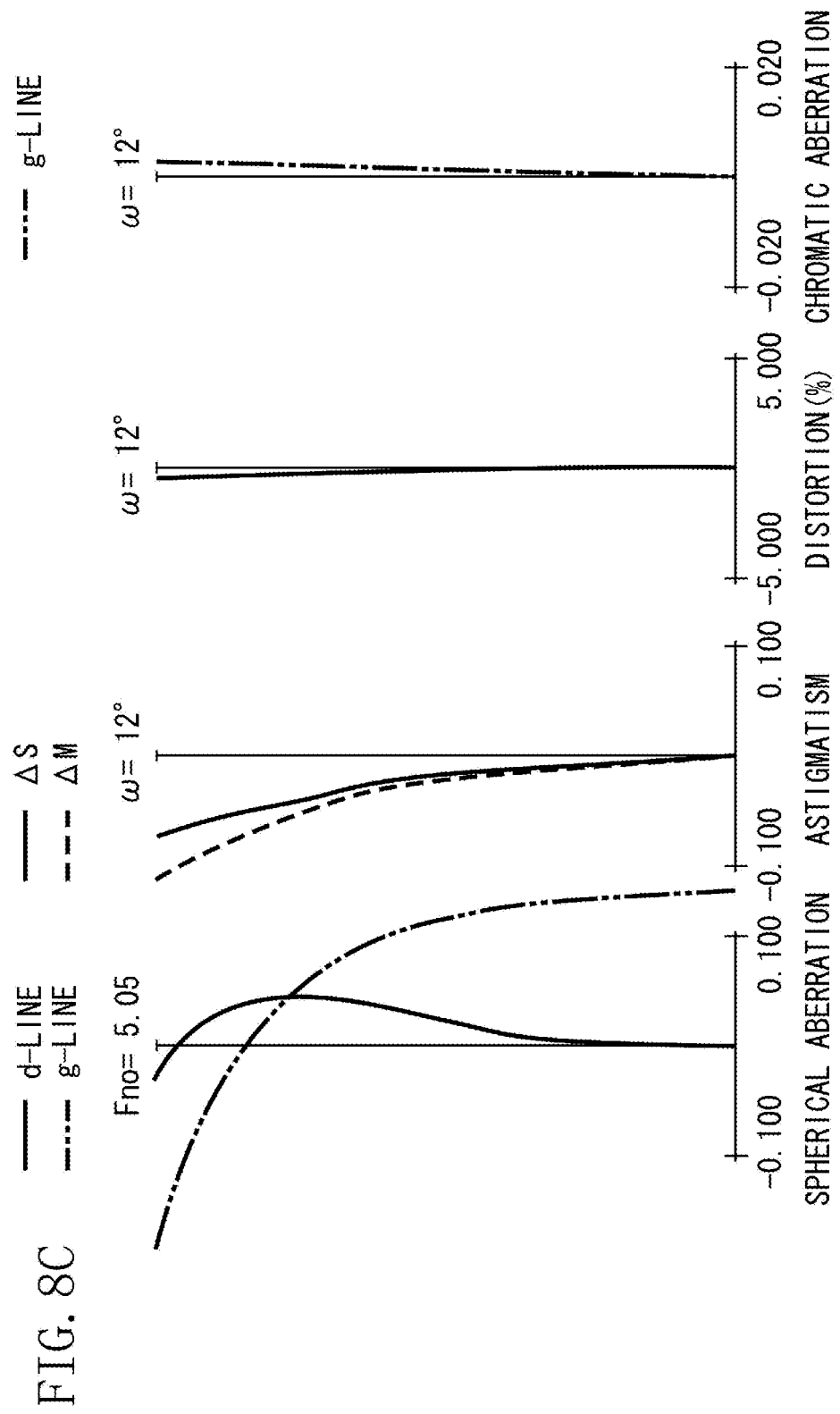

FIG. 5 is a cross-sectional view illustrating the zoom lens according to the third embodiment of the invention at the wide-angle end. FIGS. 6A, 6B, and 6C are aberration charts of the zoom lens according to the third embodiment at the wide-angle end, the middle focal length, and the telephoto end, respectively. The third embodiment relates to a zoom lens having a zoom ratio of 3.8 and an aperture ratio of 2.1 to 5.4. FIG. 7 is a cross-sectional view illustrating the zoom lens according to the fourth embodiment at the wide-angle end. FIGS. 8A, 8B, and 8C are aberration charts of the zoom lens according to the fourth embodiment at the wide-angle end, the middle focal length, and the telephoto end, respectively. The fourth embodiment relates to a zoom lens having a zoom ratio of 3.5 and an aperture ratio of 2.1 to 5.1.

Figure 10B:
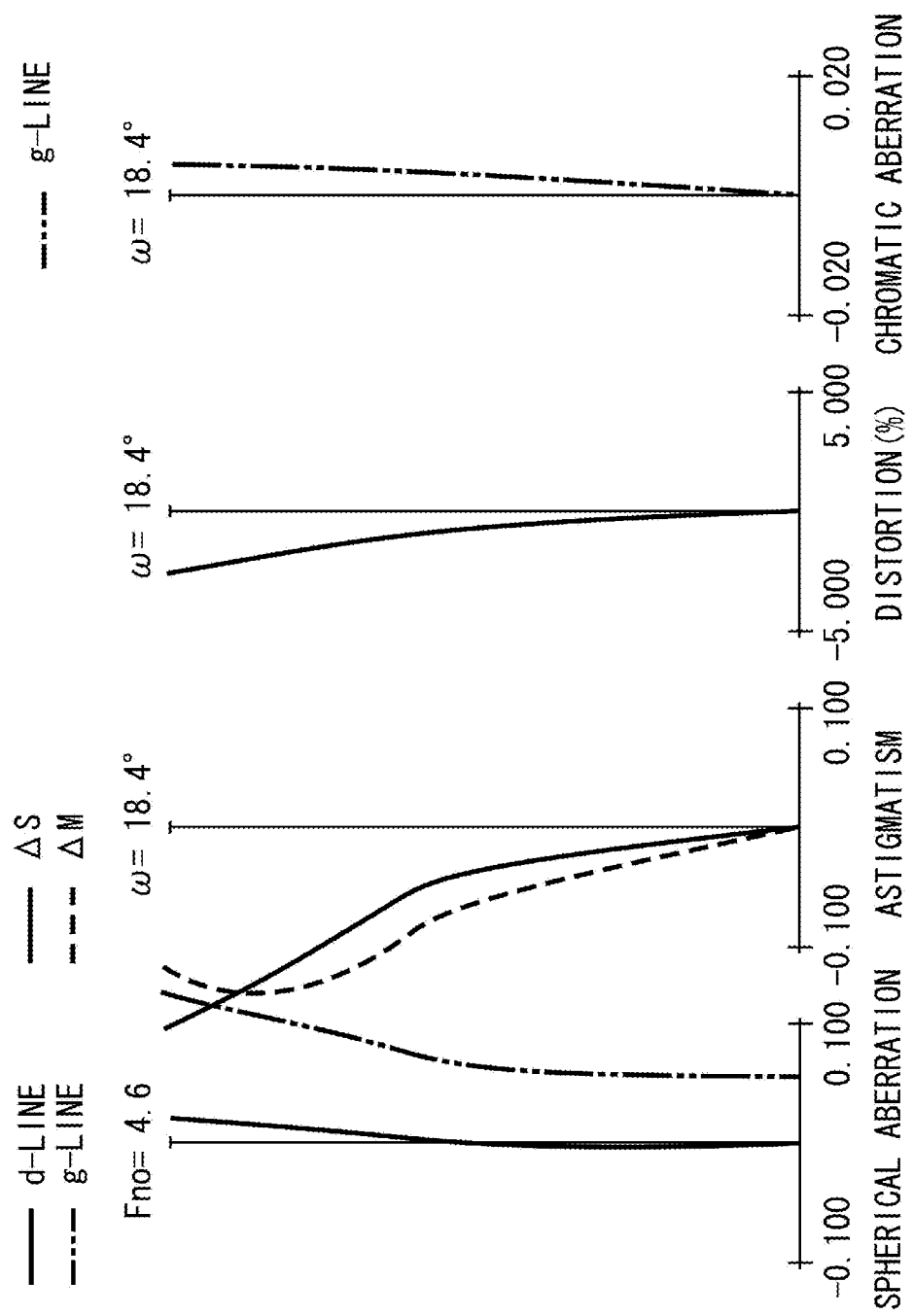
Figure 10C:
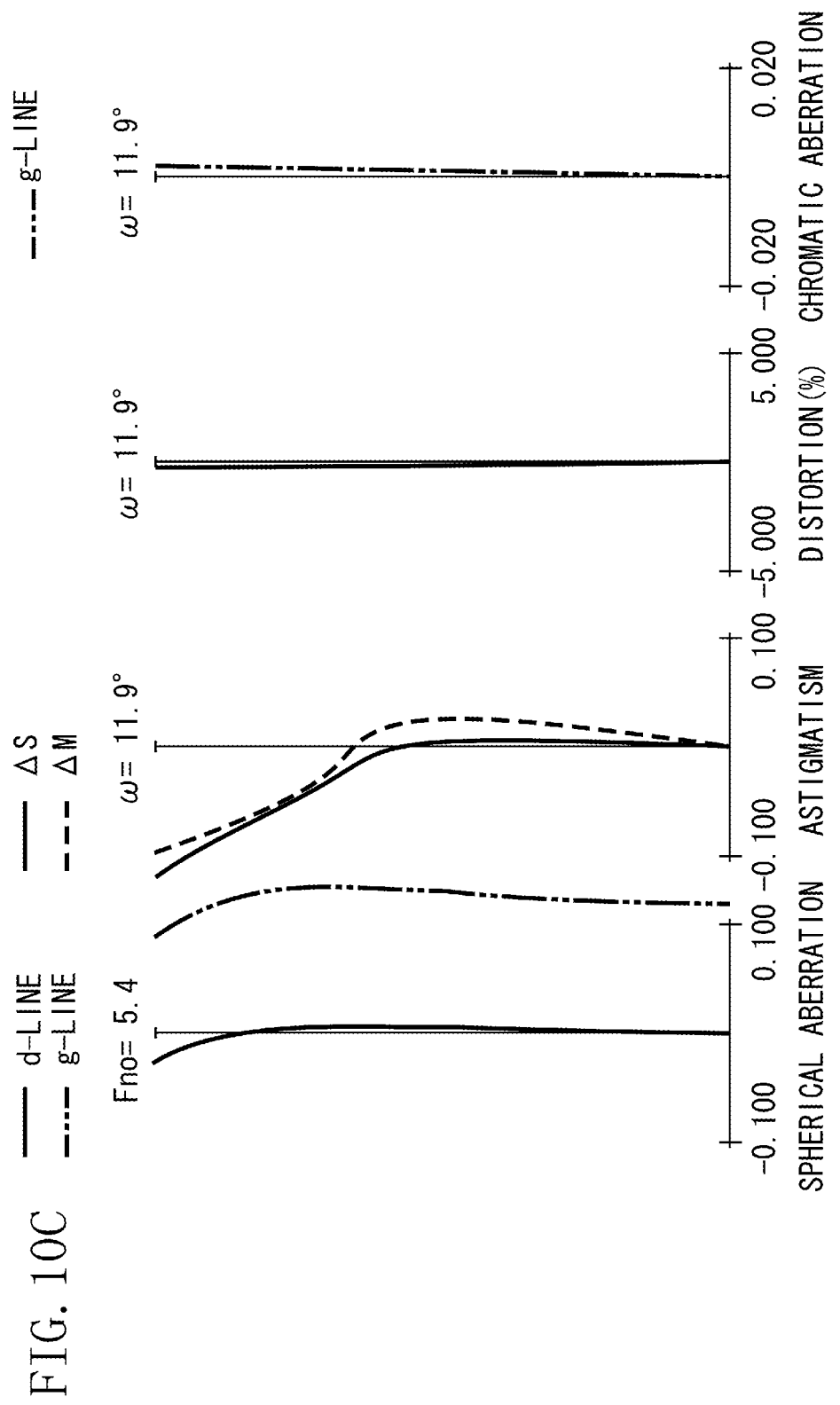
Figure 12A:
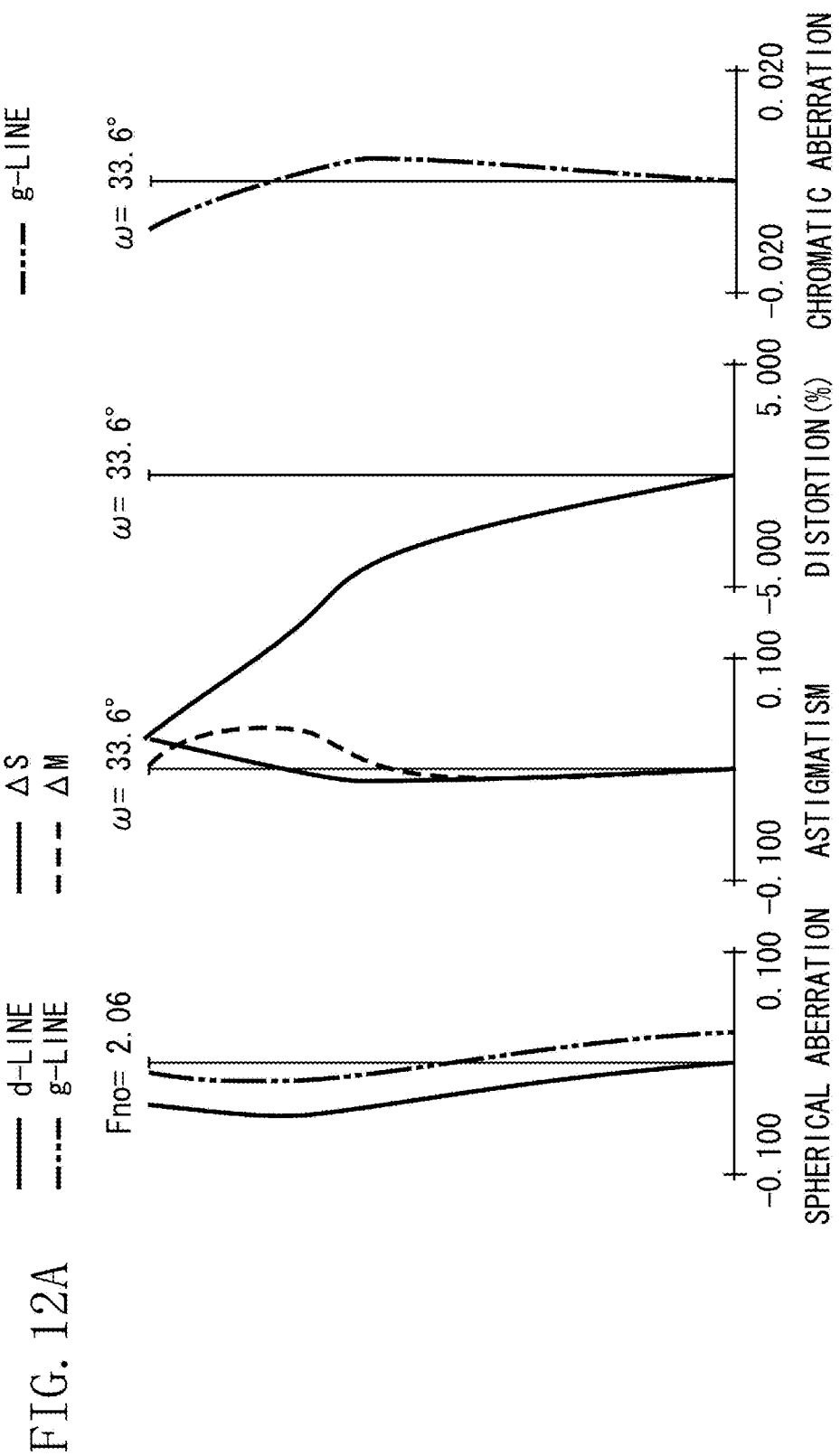
FIGS. 12A, 12B, and 12C are aberration charts of the zoom lens according to the sixth embodiment of the invention at the wide-angle end, the middle zoom position, and the telephoto end, respectively.
Figure 12B:
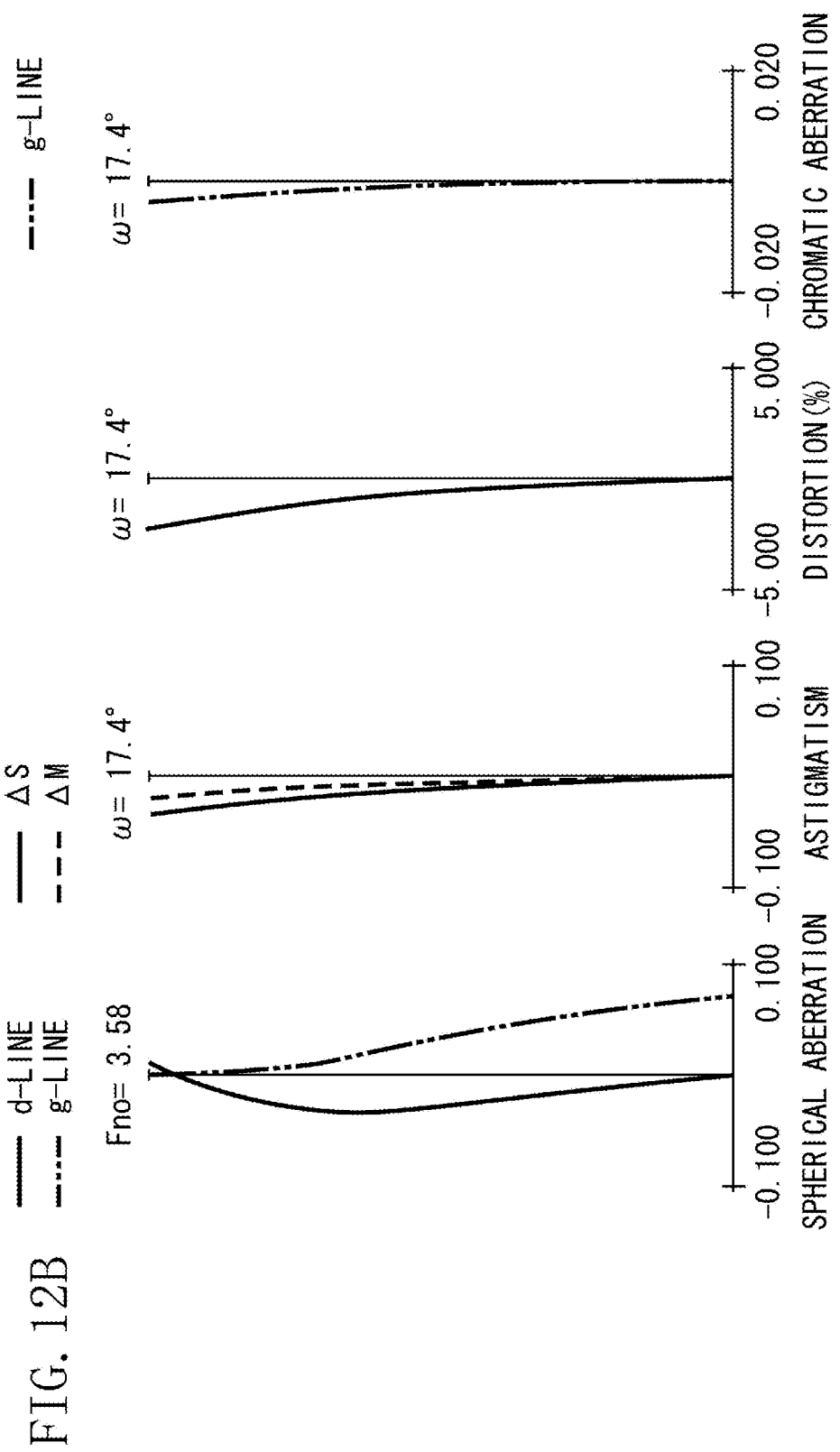
Figure 12C:
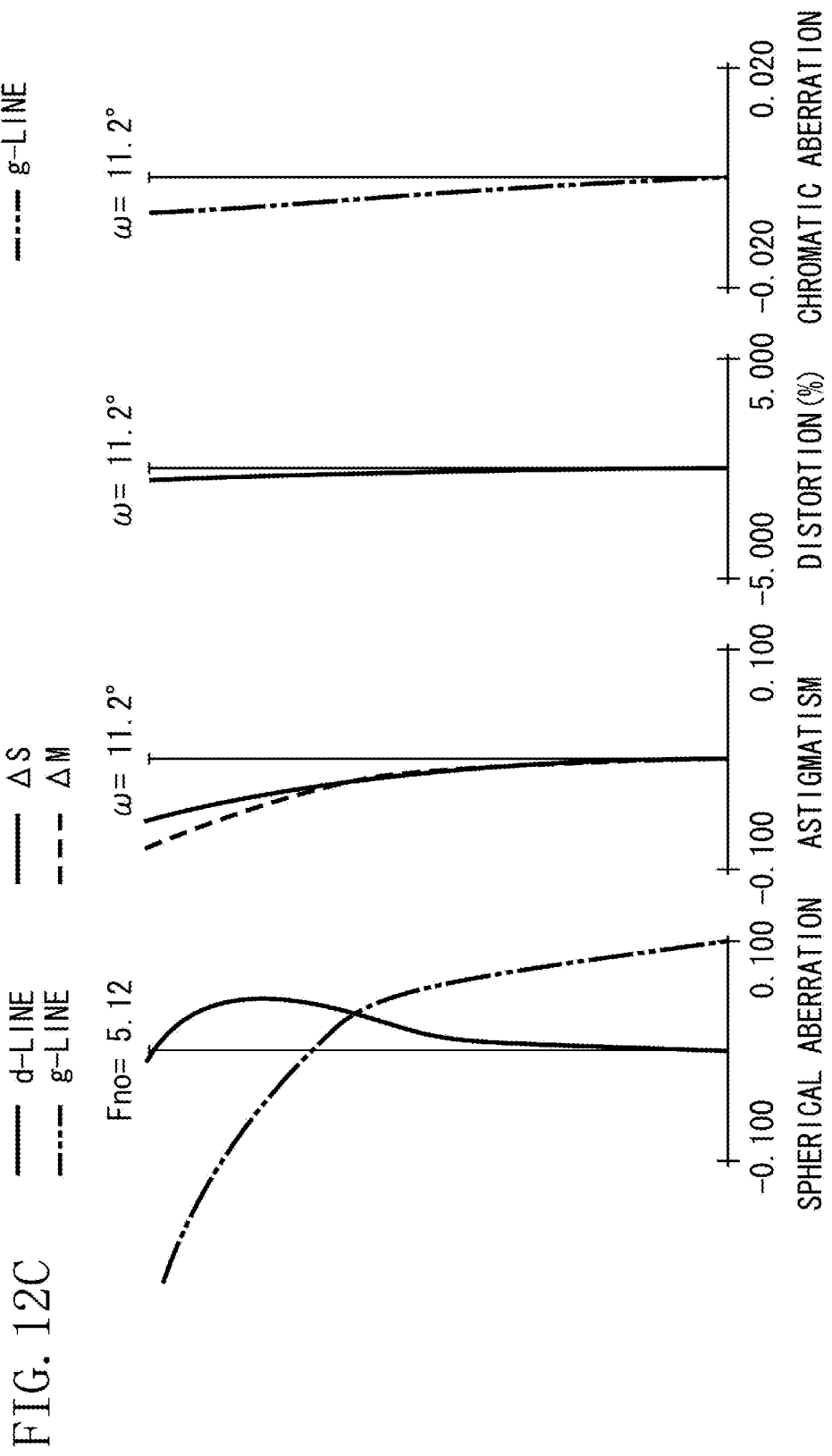

FIG. 9 is a cross-sectional view illustrating the zoom lens according to the fifth embodiment at the wide-angle end. FIGS. 10A, 10B, and 10C are aberration charts of the zoom lens according to the fifth embodiment at the wide-angle end, the middle focal length, and the telephoto end, respectively. Numerical Example 5 relates to a zoom lens having a zoom ratio of 3.7 and an aperture ratio of 2.1 to 5.4. FIG. 11 is a cross-sectional view illustrating the zoom lens according to the sixth embodiment at the wide-angle end. FIGS. 12A, 12B, and 12C are aberration charts of the zoom lens according to the sixth embodiment at the wide-angle end, the middle focal length, and the telephoto end, respectively. The sixth embodiment relates to a zoom lens having a zoom ratio of 3.7 and an aperture ratio of 2.1 to 5.4.

Figure 13:
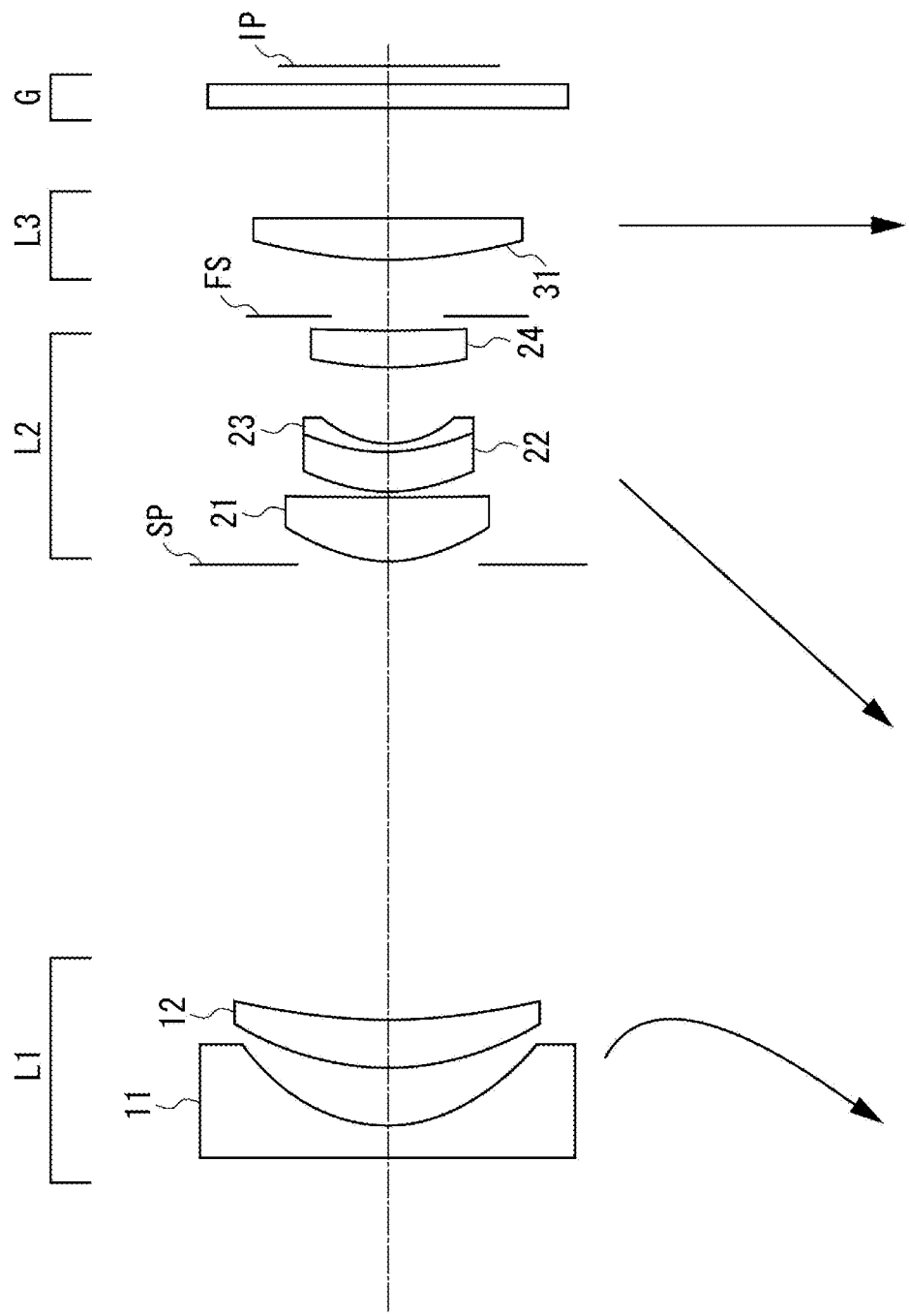
FIG. 13 is a lens cross-sectional view illustrating a zoom lens according to a seventh embodiment of the invention at the wide-angle end.
Figure 14A:
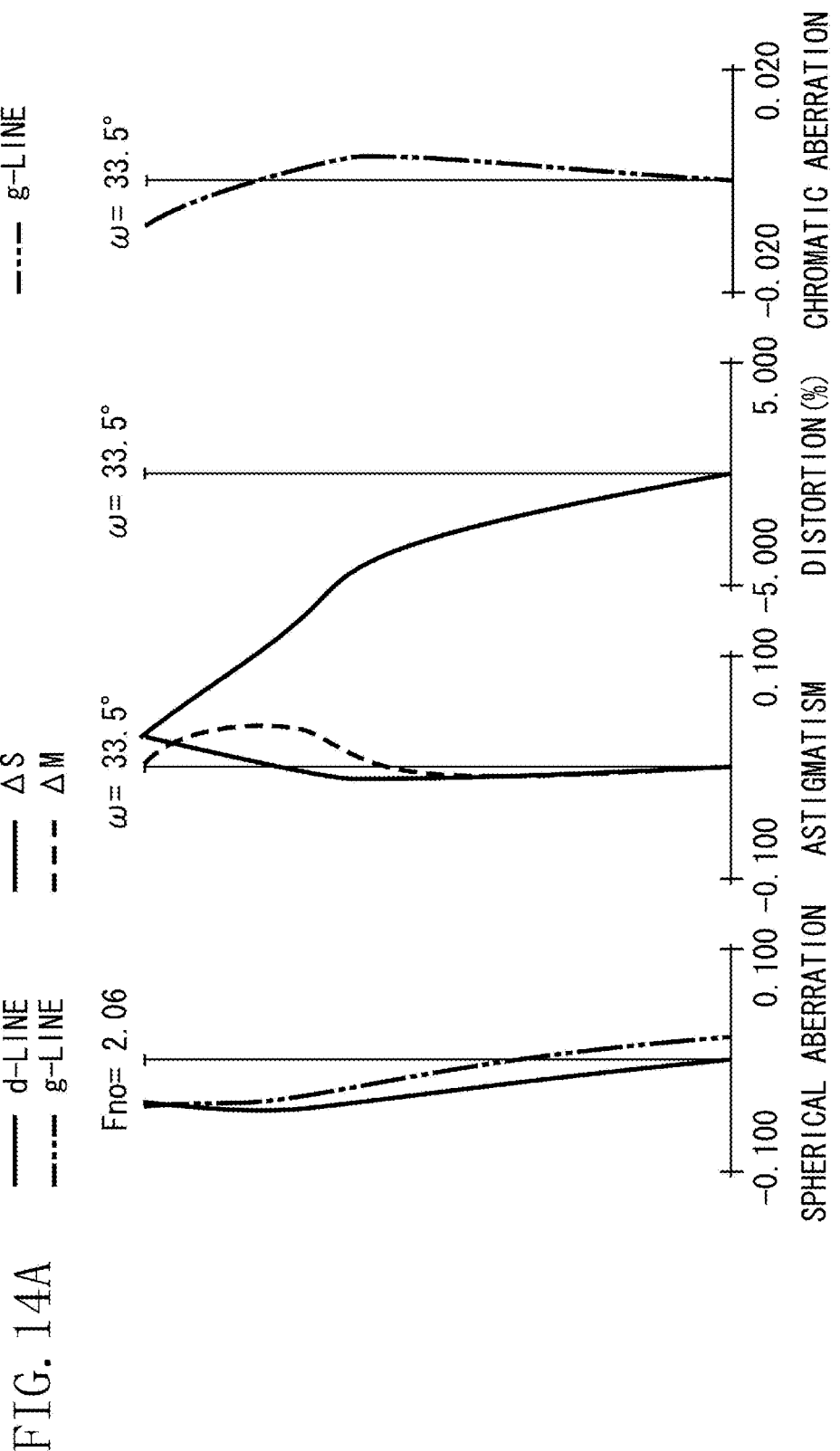
FIGS. 14A, 14B, and 14C are aberration charts of the zoom lens according to the seventh embodiment of the invention at the wide-angle end, the middle zoom position, and the telephoto end, respectively.
Figure 14B:
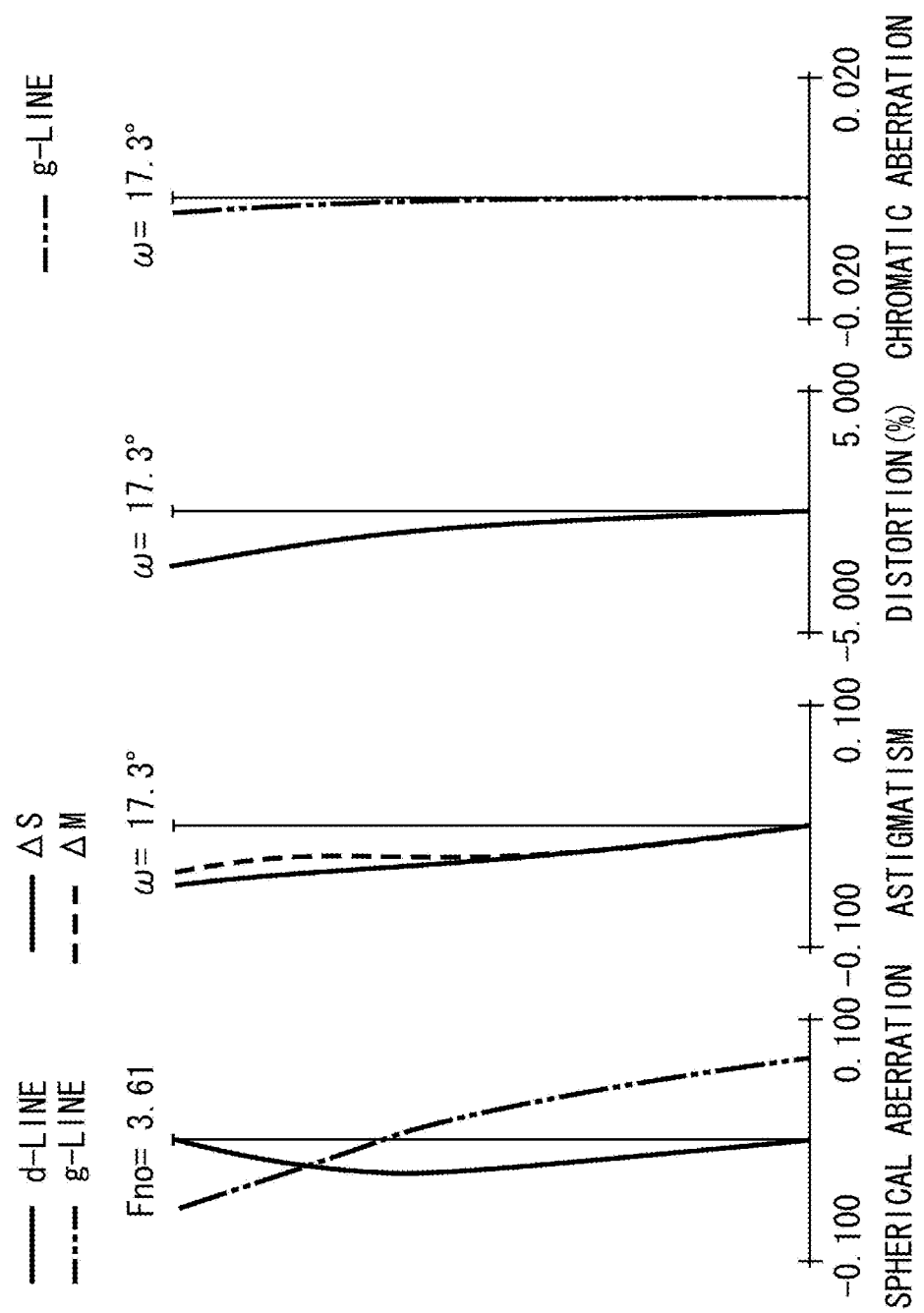
Figure 14C:
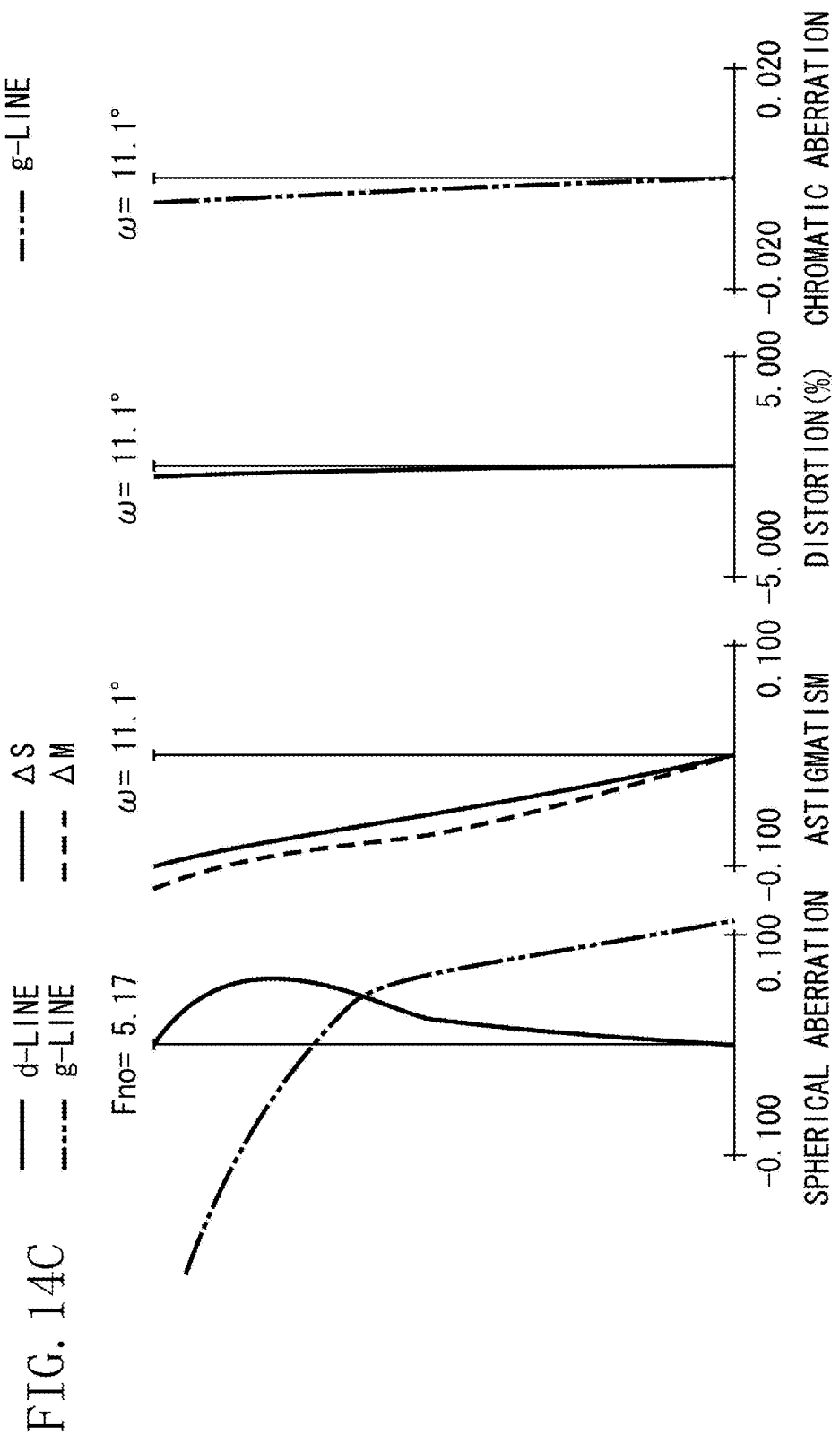
Figure 15:
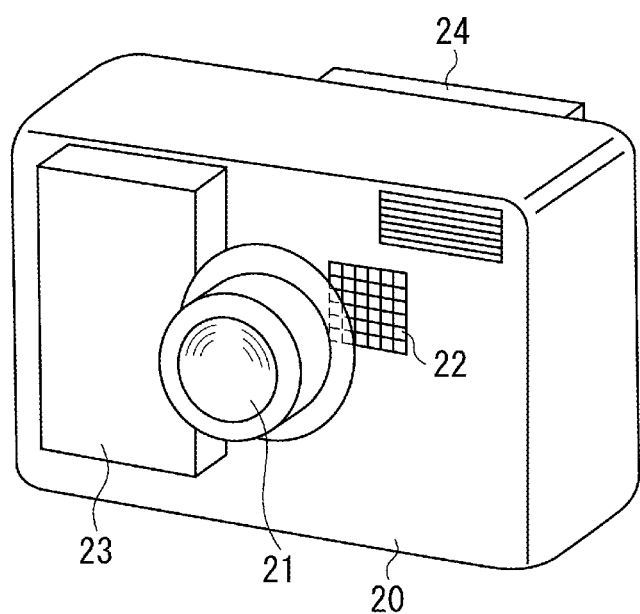
FIG. 15 is a schematic diagram illustrating main parts of an image pickup apparatus according to an exemplary embodiment of the invention.

FIG. 13 is a cross-sectional view illustrating the zoom lens according to the seventh embodiment at the wide-angle end. FIGS. 14A, 14B, and 14C are aberration charts of the zoom lens according to the seventh embodiment the wide-angle end, the middle focal length, and the telephoto end, respectively. The seventh embodiment relates to a zoom lens having a zoom ratio of 3.8 and an aperture ratio of 2.1 to 5.1. FIG. 15 is a schematic diagram illustrating main parts of an image pickup apparatus according to an exemplary embodiment of the invention. The zoom lens of each embodiment is a photographic lens system used in an image pickup apparatus such as a video camera or a digital camera. In the lens cross-sectional view, the left side refers to the object side (front side), and the right side refers to the image side (rear side). In the lens cross-sectional view, denotes the order of the lens units from the object side, and Li denotes the i-th lens unit.

For the lenses of each embodiment, the curvature, refractive index, and thickness along the optical axis will be considered regardless of a material. For example, in the case of a replica lens, the lens may be obtained by cementing a plurality of lenses. In this case, the refractive index of the cemented lens may represent an average of the lenses cemented therein. G denotes an optical block such as an optical filter, a phase plate, a crystal low-pass filter, and an infrared cut-off filter or a combination thereof. IP denotes an image plane, which corresponds to an imaging plane of a solid-state image sensor (photoelectric conversion element) such as a charge-coupled device (CCD) sensor or a complementary metal oxide semiconductor (CMOS) sensor when the zoom lens is used in the photographic optical system of a video camera or a digital camera.

In the aberration charts, d and g denote the Fraunhofer d-line and g-line, respectively, and ΔM and ΔS denote a meridional image plane and a sagittal image plane, respectively. Chromatic aberration of magnification is represented by the g-line. ω denotes a half angle of view (measured in degrees), and Fno denotes an F-number. In each embodiment described below, the wide-angle end and the telephoto end refer to zoom positions when the zoom lens unit is positioned in respective ends within the movable range on an optical axis of a mechanism.

The zoom lens of each embodiment includes a first lens unit L1 of a negative refractive power, a second lens unit L2 of a positive refractive power, and a third lens unit L3 of a positive refractive power in order from the object side to the image side. During zooming from the wide-angle end to the telephoto end, the first lens unit L1 is moved with a locus that is convex towards the image side, the second lens unit L2 is moved towards the object side, and the third lens unit L3 is moved towards the image side as indicated by the arrows of the lens cross-sectional views.

The zoom lens of each embodiment performs main zooming by moving the second lens unit L2 and corrects a movement of the image plane caused by the zooming by moving the first lens unit L1 with a locus that is convex towards the image side and moving the third lens unit L3 towards the image side. In particular, the image-side telecentric focusing necessary in the image pickup apparatus obtained by using a solid-state image sensor and the like is achieved by allowing the third lens unit L3 to serve as a field lens.

A mechanical stop (flare-cut stop) FS having a fixed aperture diameter is arranged on the image side of the second lens unit L2. The mechanical stop FS cuts off harmful rays that degrade optical performance. In general, if an aperture diameter increases across the entire zoom range, the axial light beams are incident with a large amount. However, at the same time, off-axial light beams are also incident up to a height through which the axial light beams pass. If a large amount of light is incident, the over-beam of the off-axial light beams suffers from coma flare, which adversely affects optical performance. The mechanical stop FS cuts off the over-beam of the off-axial light beams.

In such a mechanical stop FS, the coma flare of the over-beam of the off-axial light beams is cut off at maximum across the entire zoom range by setting a maximum effective diameter at which the axial light beam at the telephoto end is not cut off. As a result, it is possible to obtain excellent optical performance across the entire zoom range. In addition, it is possible to obtain excellent optical performance by removing various types of off-axial aberration using the first and third lens units L1 and L3 by interposing an aperture stop SP therebetween without increasing the number of lenses.

Next, configurations of each lens unit will be described in detail. The first lens unit L1 includes a negative lens 11 having a concave surface facing the image side and a positive lens 12 of a meniscus shape having a concave surface facing the image side in order from the object side to the image side. The first lens unit L1 has a function of focusing off-axial principal beams onto a center of the aperture stop. Particularly, in the wide-angle side, since the refractive amount of the off-axial principal beam is large, various types of off-axial aberration including, particularly, astigmatism and distortion are easily generated.

In this regard, according to the present embodiment, an increase of a diameter of the lens closest to the object side is suppressed using the first lens unit L1 including a single negative lens 11 and a single positive lens 12. In addition, the object-side lens surface of the negative lens 11 is set to have an aspheric shape in which the negative refractive index increases from the lens center to the lens periphery, and the image-side lens surface is set to have an aspheric shape in which the negative refractive power decreases from the lens center to the lens periphery.

As a result, astigmatism is appropriately corrected. In addition, since the first lens unit L1 includes a small number of lenses (two lenses), the entire lens has a compact size. Since the first lens unit L1 includes a small number of lenses (two lenses) made of a high-refractive material, a compact size is also obtained in the radial direction.

In an image pickup apparatus according to an exemplary embodiment of the invention, distortion of an image may be corrected through image processing (electronic correction). As a result, the entire zoom lens is easily miniaturized. In addition, each lens surface excluding the object-side lens surface of the negative lens 11 of the first lens unit L1 has a lens shape approximate to a concentric spherical surface centered at an intersection between the aperture stop SP and the optical axis in order to suppress off-axial aberration generated by refraction of the off-axial principal beam.

The object-side lens surface of the negative lens 11 has a paraxially flat or approximately flat shape in order to correct curvature of field while distortion is allowed up to an electrically correctable amount. The second lens unit L2 includes a positive lens 21 having a convex shape facing the object, a positive lens 22 having a convex surface facing the object side, a negative lens 23 having a concave surface facing the image side, and a positive lens 24. Although the positive lens 22 and the negative lens 23 are cemented to provide a cemented lens, they may be independently provided.

If a large aperture is implemented at the wide-angle end, the axial light beam in the vicinity of the aperture stop SP is widened in a radial direction so that aberration such as spherical aberration or coma increases.

In general, aberration is generated when the light beam is refracted at the lens surface. Aberration increases as refraction increases. For this reason, the positive lens 21 is arranged in a position on the optical axis where the image-side axial light beam is raised by the aperture stop SP to the highest position in a radial direction. In addition, the light beam is smoothly refracted, and generation of various types of aberration is suppressed by causing the lens to have a convex shape facing the object side and appropriately setting the refractive power (optical power=inverse of focal length). In addition, aberration including, particularly, spherical aberration and coma is appropriately corrected by causing both surfaces of the positive lens 21 to have an aspheric shape.

The zoom lens is configured to divide refraction of the light beam by arranging the positive lens 22 having a convex shape facing the object side on the image side of the positive lens 21 so that generation of spherical aberration is suppressed. Spherical aberration or coma is generated by refracting the light beam at the positive lenses 21 and 22. Such aberration such as spherical aberration or coma generated in the positive lenses 21 and 22 is corrected by causing the image-side lens surface of the negative lens 23 to be concave towards the image side to inversely refract the light beam.

In order to correct various types of aberration generated in the positive lenses 21 and 22, it is necessary that the image-side lens surface of the negative lens 23 have a certain refractive power. In addition, the position of the second lens unit L2 in the optical axis direction at the wide-angle end is defined by the arrangement of refractive powers in the entire lens system. In order to appropriately maintain optical performance with a high aperture ratio, the positions of the positive lens 21, the positive lens 22, and the negative lens 23 in the optical axis direction are uniquely determined.

Specifically, in a large aperture size, the depth of focus becomes shallow, particularly, at the wide-angle end. Therefore, it is necessary to appropriately correct curvature of field. In this case, if the refractive power of the entire zoom lens is not optimized, the Petzval sum is broken so that it is difficult to correct curvature of field. In addition, in order to obtain a high aperture ratio, it is advantageous that the last lens of the second lens unit L2 is arranged in the vicinity of the image plane. In a lens system having a high aperture ratio, an angle of the axial light beam when it is incident to the image plane IP increases as the aperture diameter increases.

For this reason, if the axial light beam is not refracted by arranging the positive lens 24 in the vicinity of the image plane, the positive lens 21 where the axial light beam is raised to the highest position at the wide-angle end increases in a radial direction so that it is difficult to correct spherical aberration. Therefore, generation of spherical aberration is alleviated, and the size of the positive lens 21 is suppressed by arranging the positive lens 24 on the image side of the second lens unit L2 in addition to the third lens unit L3 of a positive refractive power arranged in the vicinity of the image plane to divide refraction. As a result, it is possible to facilitate a high aperture ratio.

Based on the description above, the positions of the positive lens 21, the positive lens 22, and the negative lens 23 in the optical axis direction and the position of the image-side lens surface of the positive lens 24 closest to the second lens unit L2 in the optical axis direction become important in order to suppress generation of spherical aberration, particularly, as the aperture diameter increases.

If miniaturization is made by making the positive lens 24 of the second lens unit L2 closest to the image side closer to the positive lens 21, the positive lens 22, and the negative lens 23, it is difficult to correct curvature of field due to an arrangement of the refractive power of the second lens unit L2. Furthermore, it is difficult to reduce a variation of spherical aberration during zooming. In particular, the third lens unit L3 includes a positive lens 31 having a convex surface facing the object side and serves as a field lens for making the image side telecentric.

If sk' denotes a back focus, f3 denotes a focal length of the third lens unit L3, and β3 denotes an imaging magnification of the third lens unit L3, the following relationship is established:

$$sk'=f3(1-\beta3),$$

where $0<\beta3<1.0$.

Here, if the third lens unit L3 is moved towards the image side during zooming from the wide-angle end to the telephoto end, the back focus sk' decreases, and the imaging magnification β3 of the third lens unit L3 increases at the wide-angle end. As a result, since the third lens unit L3 can share variable power, it is possible to reduce a movement amount of the second lens unit L2. In addition, it is possible to facilitate miniaturization of the entire zoom lens by reducing the movement amount during zooming of the second lens unit L2 for obtaining a predetermined zoom ratio.

When a close object is imaged using the zoom lens of each embodiment, the first lens unit L1 is moved towards the object side. Alternatively, the third lens unit L3 may be moved towards the object side. In addition, when focusing is performed using the third lens unit L3, the third lens unit L3 may be arranged on the image side at the telephoto end where the movement amount increases for focusing by moving the third lens unit L3 towards the image side during zooming from the wide-angle end to the telephoto end. For this reason, it is possible to minimize the entire movement amount of the third lens unit L3 necessary for zooming and focusing. As a result, the entire zoom lens is easily miniaturized.

In each embodiment, the second lens unit L2 includes two positive lenses, a negative lens, a positive lens in order from the object side to the image side. When Nd2p denotes an average refractive index for d-line of materials of positive lenses of the second lens unit L2, and Nd2n denotes a refractive index for d-line of a material of a negative lens of the second lens unit L2, the following conditions are satisfied:

$$1.73<Nd2p<1.92 \quad (1)$$

$$1.90<Nd2n<2.40 \quad (2)$$

The conditions (1) and (2) are to appropriately define an average refractive index of materials of positive lenses of the second lens unit L2 in order to obtain a high aperture ratio and excellent optical performance. If the lower limit of any one of the conditions (1) and (2) is exceeded, a balance of the Petzval sum is broken although the second lens unit L2 is somewhat miniaturized. As a result, curvature of field greatly increases, and it is difficult to obtain excellent optical performance.

In addition, it is necessary to increase the lens effective diameter of the second lens unit L2 in order to obtain a high aperture ratio. Therefore, spherical aberration increases, and it is difficult to obtain excellent optical performance. In addition, more usefully, the conditions (1) and (2) may be re-established as follows:

$$1.73<Nd2p<1.90 \quad (1a)$$

$$1.90<Nd2n<2.30 \quad (2a)$$

The conditions (1a) and (2a) are to define a numerical value of the upper limit of the conditions (1) and (2). If the value is higher than the upper limit, the refractive indices of each lens increase, and thicknesses of lenses can be reduced. However, as the aperture diameter increases, spherical aberration and coma are deteriorated. Furthermore, axial chromatic aberration at the telephoto end is deteriorated so that it is difficult to obtain excellent optical performance.

In each embodiment, more usefully, at least one of the following conditions is satisfied. f1 denotes a focal length of the first lens unit L1, f2 denotes a focal length of the second lens unit L2, fw denotes a focal length of the entire zoom lens at the wide-angle end, ft denotes a focal length of the entire zoom lens at the telephoto end, f21 denotes a focal length of the positive lens 21 of the second lens unit L2 located in the position closest to the object side, and m2 denotes a movement amount of the second lens unit L2 in the optical axis direction during zooming from the wide-angle end to the telephoto end (the sign of the movement amount is set to be positive when it is moved towards the image side).

Dd2 denotes a thickness of the second lens unit L2 on the optical axis, and Dd21 denotes a thickness on the optical axis of the positive lens 21 of the second lens unit L2 closest to the object side. Nd2min denotes the lowest refractive index for d-line out of the lenses of the second lens unit L2. f2p denotes an average focal length of the positive lenses of the second lens unit L2. R21a denotes a radius of curvature of the object-side lens surface of the positive lens 21 of the second lens unit L2 closest to the object side, and R21b denotes a radius of curvature of the image-side lens surface of the positive lens 21.

Here, at least one of the following conditions is usefully satisfied:

$$0.15 < f2/\sqrt{(fw \cdot ft)} < 1.15 \tag{3}$$

$$0.75 < f21/f2 < 1.60 \tag{4}$$

$$0.95 < m2/f21 < 2.20 \tag{5}$$

$$1.90 < Dd2/Dd21 < 4.00 \tag{6}$$

$$1.65 < Nd2\min < 1.85 \tag{7}$$

$$0.90 < f2p/f2 < 4.00 \tag{8}$$

$$-1.30 < (R21a + R21b)/(R21a - R21b) < -1.00 \tag{9}$$

$$0.90 < f2/|f1| < 1.20 \tag{10}$$

$$1.50 < f2/fw < 2.60 \tag{11}$$

Next, technical meanings of each condition will be described.

The condition (3) relates to a ratio of the square root of the product between a focal length of the entire zoom lens at the wide-angle end and a focal length of the entire zoom lens at the telephoto end for the focal length of the second lens unit L2. The condition (3) is a condition for miniaturizing the entire lens system and obtaining a high aperture ratio and excellent optical performance by appropriately setting the focal length of the second lens unit L2. If the upper limit of the condition (3) is exceeded, the positive refractive power of the second lens unit L2 decreases. Therefore, the movement amount of the second lens unit L2 increases during zooming in order to obtain a desired zoom ratio so that it is difficult to miniaturize the entire zoom lens. More usefully, the condition (3a) is set as follows:

$$0.20 < f2/\sqrt{(fw \cdot ft)} < 1.15 \tag{3a}$$

If the lower limit of the condition (3a) is exceeded, and the refractive power of the second lens unit L2 increases, curvature of field increases, particularly, at the wide-angle end, and astigmatism is deteriorated. Furthermore, spherical aberration is deteriorated due to a high aperture ratio so that it is difficult to obtain excellent optical performance. In addition, since the number of lenses of the second lens unit L2 increases in order to correct astigmatism and coma, it is difficult to obtain miniaturization. In addition, more usefully, the numerical range of the condition (3a) is set as follows:

$$0.40 < f2/\sqrt{(fw \cdot ft)} < 1.15 \tag{3b}$$

The condition (4) is to define a focal length of the positive lens 21 of the second lens unit L2 closest to the object side. If the lower limit of the condition (4) is exceeded, the refractive power for refracting the axial light beam in the positive lens 21 of the second lens unit L2 closest to the object side excessively increases so that it is difficult to correct spherical aberration, coma, and the like. In addition, since the depth of focus becomes shallow as the aperture ratio increases, it is necessary to appropriately correct curvature of field. However, if the lower limit of the condition (4) is exceeded, the Petzval sum decreases, and curvature of field is generated significantly, which is not useful.

More usefully, the condition (4) is set as follows:

$$0.75 < f21/f2 < 1.50 \tag{4a}$$

The condition (4a) is to define the upper limit of the condition (4). If the upper limit of the condition (4a) is exceeded, the refractive power of the positive lens 21 of the second lens unit L2 closest to the object side increases so that it is difficult to correct spherical aberration, coma, and the like, which is not useful.

More usefully, the numerical range of the condition (4a) is set as follows:

$$0.75 < f21/f2 < 1.25 \tag{4b}$$

More usefully, the numerical range of the condition (4b) is set as follows:

$$0.75 < f21/f2 < 1.15 \tag{4c}$$

The condition (5) is a condition for mainly miniaturizing the lens system and obtaining excellent optical performance regarding the movement amount m2 of the second lens unit L2 during zooming from the wide-angle end to the telephoto end.

Here, the sign of the movement amount m2 is set to be positive when the second lens unit L2 is located on the image side at the telephoto end relative to the wide-angle end or is set to be negative when it is located on the object side. If the upper limit of the condition (5) is exceeded, the movement amount of the second lens unit L2 for the zooming increases, and the entire lens length increases, which is not useful.

More usefully, the condition (5) is set as follows:

$$1.00 < m2/f21 < 2.20 \tag{5a}$$

If the lower limit of the condition (5a) is exceeded, the movement amount during zooming of the second lens unit L2 decreases. Therefore, in order to obtain a desired zoom ratio, it is necessary to increase the refractive power of the second lens unit L2. As a result, the second lens unit L2 increases spherical aberration and axial chromatic aberration, which is not useful. In addition, since the curvature of the lens surfaces of the lenses of the second lens unit L2 increases, the thickness of the second lens unit L2 increases, and the entire lens length increases so that it is difficult to achieve miniaturization.

More usefully, the numerical range of the condition (5a) is set as follows:

$$1.25 < m2/f21 < 2.20 \tag{5b}$$

More usefully, the numerical range of the condition (5b) is set as follows:

$$1.50 < m2/f21 < 2.15 \tag{5c}$$

The condition (6) is a condition for miniaturizing the lens system by defining a thickness of the second lens unit L2 on the optical axis.

If the upper limit of the condition (6) is exceeded, the thickness of the second lens unit L2 on the optical axis increases so that it is difficult to achieve miniaturization. In addition, more usefully, the condition (6) is set as follows:

$$2.0 < Dd2/Dd21 < 3.70 \tag{6a}$$

The condition (7) is a condition for miniaturizing the lens system and obtaining excellent optical performance by appropriately setting the refractive indices of materials of the lenses of the second lens unit L2. If the lower limit of the condition (7) is exceeded, it is necessary to increase the powers of each lens of the second lens unit L2 in order to obtain a desired zoom ratio. For this reason, the curvature of the lens surface, and, particularly, a radius of curvature of the image-side lens surface decreases so that it is difficult to perform lens formation. In addition, since the number of lenses of the second lens unit L2 increases in order to obtain a desired zoom ratio by decreasing the curvature, a size of the entire zoom lens increases, which is not useful.

In the zoom lens including a first lens unit of a negative refractive power and a second lens unit of a positive refractive power arranged in order from the object side to the image side, the height of the beam in the second lens unit L2 increases, particularly, at the wide-angle side. For this reason, error sensitivity easily increases in the second lens unit L2. If a high-refractive optical material is used in the lens of the second lens unit L2, it is possible to increase the refractive power of the lens without increasing the curvature of the lens surface.

More usefully, the condition (7) is set as follows:

$$1.69 < Nd2\text{min} < 1.80 \tag{7a}$$

The condition (8) is a condition for miniaturizing the lens system and obtaining excellent optical performance by appropriately setting the focal length (inverse of the refractive power) of the positive lens of the second lens unit L2.

If the lower limit of the condition (8) is exceeded, the curvature of the lens surfaces of each positive lens of the second lens unit L2 increases so that it is difficult to correct spherical aberration. If the upper limit of the condition (8) is exceeded, the refractive power of the positive lens decreases so that it is difficult to correct the negative Petzval sum generated in the first lens unit L1. This makes it difficult to obtain excellent optical performance.

More usefully, the condition (8) is set as follows:

$$0.95 < f2p/f2 < 3.50 \tag{8a}$$

More usefully, the numerical range of the condition (8a) is set as follows:

$$0.98 < f2p/f2 < 3.30 \tag{8b}$$

The condition (9) is a condition for obtaining excellent optical performance by appropriately setting the lens shape of the positive lens 21 of the second lens unit closest to the object side.

In the zoom lens having a high aperture ratio, spherical aberration is significantly generated from the positive lens 21 closest to the object side out of the second lens unit L2 of a positive refractive power. The condition (9) defines the shape factor (lens shape) satisfied by the positive lens 21 closest to the object side out of the second lens unit L2 in order to suppress the amount of spherical aberration.

If the upper limit of the condition (9) is exceeded, it is difficult to sufficiently correct spherical aberration generated from the second lens unit L2. In addition, more usefully, the condition (9) is set as follows:

$$-1.25 < (R21a + R21b)/(R21a - R21b) < -1.00 \tag{9a}$$

The condition (9a) is to provide another lower limit of the condition (9). Even when the lower limit of the condition (9a) is exceeded, it is difficult to sufficiently correct spherical aberration generated in the second lens unit L2.

More usefully, the numerical range of the condition (9a) is set as follows:

$$-1.18 < (R21a + R21b)/(R21a - R21b) < -1.00 \tag{9b}$$

More usefully, the numerical range of the condition (9b) is set as follows:

$$-1.13 < (R21a + R21b)/(R21a - R21b) < -1.00 \tag{9c}$$

The condition (10) is to define a ratio of the refractive power between the second lens unit L2 and the first lens unit L1.

If the lower limit of the condition (10) is exceeded, the positive refractive power of the second lens unit L2 significantly increases. Therefore, particularly, curvature of field increases at the wide-angle end, and astigmatism is deteriorated. In addition, it is necessary to increase the movement amount of the first lens unit L1 during zooming. Therefore, the front lens effective diameter increases, and the entire lens length increases, which is not useful. More usefully, the condition (10) is set as follows:

$$0.90 < f2/|f1| < 1.10 \tag{10a}$$

The condition (10a) is to provide another upper limit of the condition (10). If the upper limit of the condition (10a) is exceeded, the positive refractive power of the second lens unit L2 decreases. Therefore, it is necessary to increase a variation amount of an air distance between the first and third lens units L1 and L3 in order to obtain a desired zoom ratio. As a result, the entire zoom lens becomes large-sized, which is not useful.

More usefully, the numerical range of the condition (10a) is set as follows:

$$0.85 < f2/|f1| < 1.05 \tag{10b}$$

The condition (11) is a condition for miniaturizing the entire zoom lens and obtaining a balance of optical performance by appropriately setting the focal length of the second lens unit L2 regarding a ratio between the focal length of the second lens unit L2 and the focal length of the entire zoom lens at the wide-angle end.

If the upper limit of the condition (11) is exceeded, the positive refractive power of the second lens unit L2 decreases. Therefore, it is necessary to increase a variation amount of an air distance between the first and third lens units L1 and L3 in order to obtain a desired zoom ratio. As a result, the entire zoom lens becomes large-sized, which is not useful. More usefully, the condition (11) is set as follows:

$$1.60 < f2/fw < 2.60 \tag{11a}$$

The condition (11a) is to provide another lower limit of the condition (11).

If the lower limit of the condition (11a) is exceeded, the positive refractive power of the second lens unit L2 excessively increases. Therefore, various types of aberration are significantly generated in the second lens unit L2 so that it is difficult to correct aberration using a small number of lenses. More usefully, the numerical range of the condition (11a) is set as follows:

$$1.70 < f2/fw < 2.50 \tag{11b}$$

More usefully, the numerical range of the condition (11b) is set as follows:

$$1.80 < f2/fw < 2.30 \tag{11c}$$

In addition, in each of the conditions described above, only the upper limit or the lower limit of the subsidiary conditions obtained by further limiting the ranges of each condition may be substituted with the upper limit or the lower limit of the aforementioned condition.

As described above, according to each exemplary embodiment, it is possible to obtain a compact zoom lens with a high aperture ratio, high performance, a wide angle of view, and a high zoom ratio across the entire zoom range from the wide-angle end to the telephoto end.

Next, Numerical Examples 1 to 7 corresponding to the first to seventh embodiments will be described for specific numerical data. In each numerical example, i denotes the order of the optical surface on the object side; ri denotes a radius of curvature of the lens surface; di denotes a distance or space on the optical axis between the i-th surface and the (i+1)th surface; and ndi and vdi denote a refractive index and an Abbe number, respectively, of a material of the i-th optical member with respect to the d-line. Each lens unit may have a combination of spherical and aspherical surfaces. Thus, for distinction, aspherical surfaces are denoted by an asterisk (*) to the right of the surface number. In an aspheric surface, a displacement x in an optical axis direction in a position of a height h from the optical axis with a surface vertex as a reference can be expressed as follows:

$$X=(h^2/R)/[1+\{1-(1+k)(h/R)^2\}]^{1/2}+A4h^4+A6h^6+A8h^8+A10h^{10},$$

where k denotes a conic constant, A4, A6, A8, and A10 denote second-order, fourth-order, sixth-order, eighth-order, and tenth-order aspheric coefficients, respectively, and R denotes a paraxial radius of curvature. Values expressed in scientific notation "e-00X" are equivalent to values expressed in exponential notation "×10$^{-x}$." In addition, a relation between the conditions and the numerical examples described above is represented in Table 1.

Numerical Example 1

Surface data

| Surface number | r | d | nd | vd | Effective diameter |
|---|---|---|---|---|---|
| 1* | ∞ | 1.20 | 1.84954 | 40.1 | 12.54 |
| 2* | 5.548 | 2.31 | | | 9.97 |
| 3 | 10.293 | 1.60 | 1.92286 | 18.9 | 10.45 |
| 4 | 21.778 | Variable | | | 10.15 |
| 5 (Stop) | ∞ | 0.50 | | | 6.79 |
| 6* | 6.486 | 2.30 | 1.74330 | 49.3 | 7.12 |
| 7* | 275.040 | 0.20 | | | 6.65 |
| 8 | 6.768 | 1.65 | 1.77250 | 49.6 | 6.08 |
| 9 | 48.200 | 0.50 | 2.00069 | 25.5 | 5.38 |
| 10 | 3.987 | 1.65 | | | 4.78 |
| 11 | 11.981 | 1.40 | 1.83481 | 42.7 | 5.39 |
| 12 | 65.410 | 0.60 | | | 5.45 |
| 13 | ∞ | Variable | | | 4.27 |
| 14 | 16.391 | 1.70 | 1.48749 | 70.2 | 9.47 |
| 15 | -21.482 | Variable | | | 9.43 |
| 16 | ∞ | 0.95 | 1.51633 | 64.1 | 12.56 |
| 17 | ∞ | 1.05 | | | 12.56 |
| Image plane | ∞ | | | | |

Aspheric data

1st surface

K = -7.54512e+008  A4 = -1.88618e-004  A6 = 6.44928e-006
A8 = -6.21908e-008  A10 = -6.47132e-014

2nd surface

K = -2.34707e+000  A4 = 1.05626e-003  A6 = -2.43088e-005
A8 = 1.14036e-006  A10 = -1.85511e-008

6th surface

K = -1.83908e-001  A4 = -2.23674e-004  A6 = 2.76144e-009
A8 = -1.83041e-007  A10 = -4.63046e-009

7th surface

K = 4.86718e+003  A4 = -5.35130e-005  A6 = -6.71896e-007
A8 = 4.03626e-007  A10 = -4.23510e-008

Various data
Zoom ratio 3.80

| | Wide angle | Middle | Telephoto |
|---|---|---|---|
| Focal length | 5.00 | 9.70 | 19.00 |
| F-number | 2.06 | 4.00 | 5.50 |
| Angle of view | 34.21 | 21.78 | 11.53 |
| Image height | 3.40 | 3.88 | 3.88 |
| Entire lens length | 39.04 | 36.24 | 43.37 |
| BF | 1.05 | 1.05 | 1.05 |
| d 4 | 15.46 | 6.60 | 1.99 |
| d13 | 3.69 | 9.84 | 21.78 |
| d15 | 2.27 | 2.18 | 1.99 |
| Entrance pupil position | 6.84 | 5.22 | 3.73 |
| Exit pupil position | -24.37 | -102.00 | 58.85 |
| Front-side principal point position | 10.85 | 14.01 | 28.97 |
| Rear-side principal point position | -3.95 | -8.65 | -17.95 |

Zoom lens unit data

| Unit | Starting surface | Focal length | Lens length | Front-side principal point position | Rear-side principal point position |
|---|---|---|---|---|---|
| 1 | 1 | -11.09 | 5.11 | -0.25 | -4.22 |
| 2 | 5 | 10.90 | 8.80 | -1.45 | -7.11 |
| 3 | 14 | 19.36 | 1.70 | 0.50 | -0.66 |
| 4 | 16 | ∞ | 0.95 | 0.31 | -0.31 |

Lens unit data

| Lens | Starting surface | Focal length |
|---|---|---|
| 1 | 1 | -6.53 |
| 2 | 3 | 19.82 |
| 3 | 6 | 8.90 |
| 4 | 8 | 10.02 |
| 5 | 9 | -4.37 |
| 6 | 11 | 17.36 |
| 7 | 14 | 19.36 |
| 8 | 16 | 0.00 |

Numerical Example 2

Surface data

| Surface number | r | d | nd | vd | Effective diameter |
|---|---|---|---|---|---|
| 1* | 12734.763 | 1.10 | 1.84954 | 40.1 | 12.24 |
| 2* | 5.371 | 2.47 | | | 9.75 |
| 3 | 10.589 | 1.60 | 1.92286 | 18.9 | 10.20 |
| 4 | 23.646 | Variable | | | 9.90 |
| 5 (Stop) | ∞ | 0.50 | | | 6.65 |
| 6* | 6.488 | 2.30 | 1.74330 | 49.3 | 6.99 |
| 7* | 272.676 | 0.30 | | | 6.43 |
| 8 | 7.143 | 1.75 | 1.80610 | 40.9 | 5.89 |
| 9 | -29.354 | 0.50 | 2.00069 | 25.5 | 5.25 |
| 10 | 4.173 | 1.45 | | | 4.67 |
| 11 | 12.296 | 1.20 | 1.83481 | 42.7 | 5.19 |
| 12 | 95.801 | 1.30 | | | 5.26 |
| 13 | ∞ | Variable | | | 4.27 |
| 14 | 14.891 | 1.70 | 1.58313 | 59.4 | 9.30 |
| 15 | -35.565 | Variable | | | 9.21 |
| 16 | ∞ | 0.95 | 1.51633 | 64.1 | 12.56 |
| 17 | ∞ | 1.05 | | | 12.56 |
| Image plane | ∞ | | | | |

Aspheric data

1st surface

K = -7.54512e+008  A4 = -4.96945e-005  A6 = 9.80089e-007
A8 = -2.93189e-009

2nd surface

K = -1.84750e+000  A4 = 8.96608e-004  A6 = -1.32261e-005
A8 = 3.88560e-007  A10 = -4.26518e-009

-continued

6th surface

| K = 6.66357e−002 | A4 = −1.78667e−004 | A6 = 2.32749e−006 |
|---|---|---|
| A8 = 2.74312e−007 | A10 = 1.90745e−008 | |

7th surface

| K = −7.13425e+002 | A4 = 1.81194e−004 | A6 = 1.34182e−005 |
|---|---|---|
| A8 = 7.10950e−007 | | |

Various data
Zoom ratio 3.88

| | Wide angle | Middle | Telephoto |
|---|---|---|---|
| Focal length | 4.9 | 9.63 | 19.00 |
| F-number | 2.06 | 4.60 | 5.70 |
| Angle of view | 34.76 | 21.92 | 11.53 |
| Image height | 3.40 | 3.88 | 3.88 |
| Entire lens length | 38.11 | 35.85 | 43.77 |
| BF | 1.05 | 1.05 | 1.05 |
| d 4 | 14.56 | 6.02 | 1.62 |
| d13 | 3.04 | 9.48 | 21.98 |
| d15 | 2.27 | 2.18 | 2.00 |
| Entrance pupil position | 6.50 | 4.93 | 3.52 |
| Exit pupil position | −24.12 | −140.11 | 46.91 |
| Front-side principal point position | 10.45 | 13.91 | 30.39 |
| Rear-side principal point position | −3.85 | −8.58 | −17.95 |

Zoom lens unit data

| Unit | Starting surface | Focal length | Lens length | Front-side principal point position | Rear-side principal point position |
|---|---|---|---|---|---|
| 1 | 1 | −10.82 | 5.17 | −0.41 | −4.55 |
| 2 | 5 | 10.79 | 9.30 | −1.57 | −7.65 |
| 3 | 14 | 18.23 | 1.70 | 0.32 | −0.77 |
| 4 | 16 | ∞ | 0.95 | 0.31 | −0.31 |

Lens unit data

| Lens | Starting surface | Focal length |
|---|---|---|
| 1 | 1 | −6.33 |
| 2 | 3 | 19.63 |
| 3 | 6 | 8.91 |
| 4 | 8 | 7.28 |
| 5 | 9 | −3.62 |
| 6 | 11 | 16.79 |
| 7 | 14 | 18.23 |
| 8 | 16 | 0.00 |

Numerical Example 3

Surface data

| Surface number | r | d | nd | vd | Effective diameter |
|---|---|---|---|---|---|
| 1* | −10840.973 | 1.30 | 1.84954 | 40.1 | 15.50 |
| 2* | 6.730 | 2.55 | | | 12.30 |
| 3 | 12.556 | 2.05 | 1.92286 | 18.9 | 12.70 |
| 4 | 28.855 | Variable | | | 12.40 |
| 5 (Stop) | ∞ | 0.00 | | | 8.02 |
| 6 | ∞ | 0.20 | | | 10.00 |
| 7* | 7.319 | 2.70 | 1.76414 | 49.0 | 8.40 |
| 8* | 377.634 | 0.20 | | | 7.80 |
| 9 | 8.272 | 1.60 | 1.88300 | 40.8 | 7.10 |
| 10 | −168.841 | 0.40 | 2.00069 | 25.5 | 6.50 |
| 11 | 4.735 | 2.31 | | | 5.50 |
| 12 | 21.643 | 1.60 | 1.88300 | 40.8 | 6.20 |

-continued

| 13 | −1384.644 | 0.60 | | | 6.40 |
|---|---|---|---|---|---|
| 14 | ∞ | Variable | | | 4.90 |
| 15 | 20.294 | 1.80 | 1.60311 | 60.6 | 11.00 |
| 16 | −83.433 | Variable | | | 11.00 |
| 17 | ∞ | 1.00 | 1.51633 | 64.1 | 15.00 |
| 18 | ∞ | 0.60 | | | 15.00 |
| Image plane | ∞ | | | | |

Aspheric data

1st surface

| K = −7.54512e+008 | A4 = −3.54380e−005 | A6 = 9.12293e−007 |
|---|---|---|
| A8 = −3.38114e−009 | A10 = −3.29861e−011 | |

2nd surface

| K = −2.43576e+000 | A4 = 6.76380e−004 | A6 = −8.69639e−006 |
|---|---|---|
| A8 = 1.94875e−007 | A10 = −1.96480e−009 | |

7th surface

| K = −2.89275e−001 | A4 = −1.05883e−004 | A6 = −1.41065e−006 |
|---|---|---|

8th surface

| K = 2.14084e+003 | A4 = 1.23606e−005 | A6 = −7.37910e−008 |
|---|---|---|

Various data
Zoom ratio 3.83

| | Wide angle | Middle | Telephoto |
|---|---|---|---|
| Focal length | 6.11 | 14.71 | 23.40 |
| F-number | 2.06 | 3.71 | 5.35 |
| Angle of view | 33.67 | 17.45 | 11.18 |
| Image height | 4.07 | 4.63 | 4.63 |
| Entire lens length | 45.30 | 41.79 | 48.12 |
| BF | 0.60 | 0.60 | 0.60 |
| d 4 | 18.41 | 5.03 | 1.50 |
| d14 | 4.70 | 14.68 | 24.65 |
| d16 | 3.28 | 3.16 | 3.05 |
| Entrance pupil position | 8.29 | 5.39 | 3.99 |
| Exit pupil position | −25.14 | −109.19 | 193.63 |
| Front-side principal point position | 12.95 | 18.13 | 30.22 |
| Rear-side principal point position | −5.51 | −14.11 | −22.80 |

Zoom lens unit data

| Unit | Starting surface | Focal length | Lens length | Front-side principal point position | Rear-side principal point position |
|---|---|---|---|---|---|
| 1 | 1 | −13.81 | 5.90 | −0.38 | −4.88 |
| 2 | 5 | 12.70 | 9.61 | −1.43 | −8.00 |
| 3 | 15 | 27.24 | 1.80 | 0.22 | −0.91 |
| 4 | 17 | ∞ | 1.00 | 0.33 | −0.33 |

Lens unit data

| Lens | Starting surface | Focal length |
|---|---|---|
| 1 | 1 | −7.92 |
| 2 | 3 | 22.72 |
| 3 | 7 | 9.74 |
| 4 | 9 | 8.97 |
| 5 | 10 | −4.60 |
| 6 | 12 | 24.15 |
| 7 | 15 | 27.24 |
| 8 | 17 | 0.00 |

Numerical Example 4

Surface data

| Surface number | r | d | nd | vd | Effective diameter |
|---|---|---|---|---|---|
| 1* | −22050.281 | 1.40 | 1.84954 | 40.1 | 14.90 |
| 2* | 6.673 | 2.70 | | | 12.10 |
| 3 | 12.573 | 1.90 | 1.94595 | 18.0 | 12.60 |
| 4 | 24.746 | Variable | | | 12.20 |
| 5 (Stop) | ∞ | 0.00 | | | 8.13 |
| 6 | ∞ | 0.40 | | | 10.00 |
| 7* | 7.629 | 3.00 | 1.76753 | 49.3 | 8.60 |
| 8* | 274.291 | 0.33 | | | 7.90 |
| 9 | 8.757 | 1.55 | 1.83481 | 42.7 | 7.30 |
| 10 | 62.610 | 0.85 | 2.00069 | 25.5 | 6.80 |
| 11 | 4.514 | 1.25 | | | 5.90 |
| 12 | 22.886 | 3.10 | 1.76753 | 49.3 | 6.50 |
| 13* | −22.652 | 0.20 | | | 6.50 |
| 14 | ∞ | Variable | | | 5.08 |
| 15 | 20.375 | 1.90 | 1.60311 | 60.6 | 11.00 |
| 16 | −227.361 | Variable | | | 11.00 |
| 17 | ∞ | 1.00 | 1.51633 | 64.1 | 15.00 |
| 18 | ∞ | 0.60 | | | 15.00 |
| Image plane | ∞ | | | | |

Aspheric data

1st surface

K = −7.54512e+008　A4 = −1.41638e−004　A6 = 2.43499e−006
A8 = −1.08799e−008　A10 = −8.08848e−011

2nd surface

K = −2.37809e+000　A4 = 5.52232e−004　A6 = −9.41771e−006
A8 = 2.91509e−007　A10 = −3.62121e−009

7th surface

K = −2.68719e−001　A4 = −9.96850e−005　A6 = −2.28406e−007
A8 = −1.65409e−008　A10 = −4.67934e−010

8th surface

K = 3.55301e+003　A4 = 6.20168e−005　A6 = −1.41413e−007
A8 = 3.03537e−008　A10 = −5.26369e−009

13th surface

K = −2.97220e+000　A4 = −3.95134e−004　A6 = −5.34539e−006
A8 = −8.27917e−007

Various data
Zoom ratio 3.53

| | Wide angle | Middle | Telephoto |
|---|---|---|---|
| Focal length | 6.18 | 14.00 | 21.84 |
| F-number | 2.06 | 3.62 | 5.05 |
| Angle of view | 33.39 | 18.29 | 11.96 |
| Image height | 4.07 | 4.63 | 4.63 |
| Entire lens length | 45.56 | 43.32 | 49.53 |
| BF | 0.60 | 0.60 | 0.60 |
| d 4 | 16.80 | 5.02 | 1.68 |
| d14 | 5.09 | 14.66 | 24.23 |
| d16 | 3.48 | 3.46 | 3.43 |
| Entrance pupil position | 7.86 | 5.37 | 4.12 |
| Exit pupil position | −26.08 | −81.01 | 1870.88 |
| Front-side principal point position | 12.61 | 16.98 | 26.21 |
| Rear-side principal point position | −5.58 | −13.40 | −21.24 |

Zoom lens unit data

| Unit | Starting surface | Focal length | Lens length | Front-side principal point position | Rear-side principal point position |
|---|---|---|---|---|---|
| 1 | 1 | −12.72 | 6.00 | −0.14 | −4.70 |
| 2 | 5 | 12.61 | 10.68 | −0.52 | −7.78 |
| 3 | 15 | 31.09 | 1.90 | 0.10 | −1.09 |
| 4 | 17 | ∞ | 1.00 | 0.33 | −0.33 |

Lens unit data

| Lens | Starting surface | Focal length |
|---|---|---|
| 1 | 1 | −7.85 |
| 2 | 3 | 25.11 |
| 3 | 7 | 10.17 |
| 4 | 9 | 12.04 |
| 5 | 10 | −4.90 |
| 6 | 12 | 15.28 |
| 7 | 15 | 31.09 |
| 8 | 17 | 0.00 |

Numerical Example 5

Surface data

| Surface number | r | d | nd | vd | Effective diameter |
|---|---|---|---|---|---|
| 1* | 4155.627 | 0.50 | 1.84954 | 40.1 | 12.55 |
| 2* | 5.962 | 2.22 | | | 10.05 |
| 3 | 9.850 | 1.70 | 1.92286 | 18.9 | 10.35 |
| 4 | 19.092 | Variable | | | 9.96 |
| 5 (Stop) | ∞ | 0.00 | | | 6.34 |
| 6 | ∞ | 0.50 | | | 8.37 |
| 7* | 7.193 | 1.81 | 1.69350 | 53.2 | 6.62 |
| 8* | 122.645 | 0.55 | | | 6.22 |
| 9 | 6.306 | 1.61 | 1.69680 | 55.5 | 5.69 |
| 10 | −11.995 | 0.50 | 1.90366 | 31.3 | 5.36 |
| 11 | 4.864 | 0.61 | | | 4.89 |
| 12 | 11.653 | 1.01 | 1.80610 | 40.7 | 4.99 |
| 13* | 69.822 | 0.80 | | | 5.03 |
| 14 | ∞ | Variable | | | 4.27 |
| 15 | 11.334 | 2.82 | 1.60311 | 60.6 | 9.05 |
| 16 | 54.008 | Variable | | | 8.62 |
| 17 | ∞ | 0.30 | | | 12.56 |
| 18 | ∞ | 0.70 | | | 12.56 |
| 19 | ∞ | 0.50 | 1.51633 | 64.1 | 12.56 |
| 20 | ∞ | 0.43 | | | 12.56 |
| Image plane | ∞ | | | | |

Aspheric data

1st surface

K = −7.54512e+008　A4 = 2.09226e−004　A6 = 1.70339e−006
A8 = −1.19755e−007　A10 = 1.35280e−009

2nd surface

K = −2.62077e+000　A4 = 1.29671e−003　A6 = 1.56574e−005
A8 = −9.03408e−007　A10 = 1.53650e−008

7th surface

K = 8.79607e−002　A4 = 1.06168e−004　A6 = 2.44740e−005
A8 = 4.22372e−007　A10 = 4.53528e−008

8th surface

K = −6.76906e+003　A4 = 5.74591e−004　A6 = −2.28618e−006
A8 = 3.87750e−006　A10 = −8.81234e−008

13th surface

K = −4.33148e+001　A4 = 4.78756e−004　A6 = −5.58540e−005
A8 = 5.50432e−006

-continued

Various data
Zoom ratio 3.68

|  | Wide angle | Middle | Telephoto |
|---|---|---|---|
| Focal length | 5.00 | 11.63 | 18.40 |
| F-number | 2.06 | 4.60 | 5.40 |
| Angle of view | 34.24 | 18.43 | 11.89 |
| Image height | 3.40 | 3.88 | 3.88 |
| Entire lens length | 37.25 | 34.80 | 40.12 |
| BF | 0.43 | 0.43 | 0.43 |
| d 4 | 15.25 | 4.49 | 1.51 |
| d14 | 3.04 | 11.52 | 20.01 |
| d16 | 2.41 | 2.23 | 2.06 |
| Entrance pupil position | 6.86 | 4.44 | 3.24 |
| Exit pupil position | −16.50 | −54.80 | 539.23 |
| Front-side principal point position | 10.38 | 13.62 | 22.27 |
| Rear-side principal point position | −4.57 | −11.20 | −17.97 |

Zoom lens unit data

| Unit | Starting surface | Focal length | Lens length | Front-side principal point position | Rear-side principal point position |
|---|---|---|---|---|---|
| 1 | 1 | −11.99 | 4.42 | −0.53 | −3.99 |
| 2 | 5 | 10.91 | 7.38 | −1.30 | −5.85 |
| 3 | 15 | 23.21 | 2.82 | −0.46 | −2.17 |
| 4 | 17 | ∞ | 1.50 | 0.66 | −0.66 |

Lens unit data

| Lens | Starting surface | Focal length |
|---|---|---|
| 1 | 1 | −7.03 |
| 2 | 3 | 20.26 |
| 3 | 7 | 10.95 |
| 4 | 9 | 6.15 |
| 5 | 10 | −3.78 |
| 6 | 12 | 17.22 |
| 7 | 15 | 23.21 |
| 8 | 19 | 0.00 |

Numerical Example 6

Surface data

| Surface number | r | d | nd | vd | Effective diameter |
|---|---|---|---|---|---|
| 1* | 22080.328 | 1.30 | 1.84954 | 40.1 | 15.50 |
| 2* | 6.970 | 2.39 |  |  | 12.30 |
| 3 | 12.662 | 2.05 | 1.92286 | 18.9 | 12.70 |
| 4 | 29.003 | Variable |  |  | 12.40 |
| 5 (Stop) | ∞ | 0.00 |  |  | 7.88 |
| 6 | ∞ | 0.20 |  |  | 10.00 |
| 7* | 7.357 | 2.70 | 1.76414 | 49.0 | 8.40 |
| 8* | 234.691 | 0.20 |  |  | 7.80 |
| 9 | 8.484 | 1.60 | 1.88300 | 40.8 | 7.10 |
| 10 | 15.418 | 0.40 | 2.01960 | 21.5 | 6.50 |
| 11 | 4.803 | 3.27 |  |  | 5.50 |
| 12* | 21.066 | 1.60 | 1.88300 | 40.8 | 6.20 |
| 13* | 355.151 | 0.60 |  |  | 6.40 |
| 14 | ∞ | Variable |  |  | 4.90 |
| 15 | 20.352 | 1.80 | 1.60311 | 60.6 | 11.00 |
| 16 | −679.196 | Variable |  |  | 11.00 |
| 17 | ∞ | 1.00 | 1.51633 | 64.1 | 15.00 |
| 18 | ∞ | 0.72 |  |  | 15.00 |
| Image plane | ∞ |  |  |  |  |

Aspheric data

1st surface

K = −7.54512e+008  A4 = −4.70631e−005  A6 = 1.04642e−006
A8 = −2.77812e−009  A10 = −3.12450e−011

2nd surface

K = −2.61951e+000  A4 = 6.42753e−004  A6 = −8.02703e−006
A8 = 1.75321e−007  A10 = −1.54094e−009

7th surface

K = −3.38492e−001  A4 = −1.17180e−004  A6 = −4.31284e−007
A8 = −1.44974e−008  A10 = −6.28050e−010

8th surface

K = 5.50890e+002  A4 = −5.14414e−006  A6 = 1.13152e−006
A8 = −2.07190e−008  A10 = −9.79771e−010

12th surface

K = −2.37990e−001  A4 = 4.47095e−006  A6 = −2.00430e−006
A8 = −3.45766e−007  A10 = 5.64188e−009

13th surface

K = 8.49156e+002  A4 = −2.73845e−006  A6 = 1.16882e−006
A8 = −6.21929e−007  A10 = 4.25622e−009

Various data
Zoom ratio 3.82

|  | Wide angle | Middle | Telephoto |
|---|---|---|---|
| Focal length | 6.13 | 14.75 | 23.40 |
| F-number | 2.06 | 3.58 | 5.12 |
| Angle of view | 33.59 | 17.41 | 11.18 |
| Image height | 4.07 | 4.63 | 4.63 |
| Entire lens length | 45.39 | 41.37 | 47.64 |
| BF | 0.72 | 0.72 | 0.72 |
| d 4 | 18.80 | 4.84 | 1.18 |
| d14 | 2.24 | 12.22 | 22.19 |
| d16 | 4.53 | 4.49 | 4.45 |
| Entrance pupil position | 8.59 | 5.39 | 3.81 |
| Exit pupil position | −21.47 | −59.94 | −410.96 |
| Front-side principal point position | 13.02 | 16.55 | 25.88 |
| Rear-side principal point position | −5.41 | −14.03 | −22.68 |

Zoom lens unit data

| Unit | Starting surface | Focal length | Lens length | Front-side principal point position | Rear-side principal point position |
|---|---|---|---|---|---|
| 1 | 1 | −14.33 | 5.74 | −0.30 | −4.59 |
| 2 | 5 | 12.99 | 10.57 | −0.83 | −8.89 |
| 3 | 15 | 32.79 | 1.80 | 0.03 | −1.09 |
| 4 | 17 | ∞ | 1.00 | 0.33 | −0.33 |

Lens unit data

| Lens | Starting surface | Focal length |
|---|---|---|
| 1 | 1 | −8.21 |
| 2 | 3 | 22.97 |
| 3 | 7 | 9.89 |
| 4 | 9 | 19.28 |
| 5 | 10 | −6.97 |
| 6 | 12 | 25.30 |
| 7 | 15 | 32.79 |
| 8 | 17 | 0.00 |

Numerical Example 7

Surface data

| Surface number | r | d | nd | vd | Effective diameter |
|---|---|---|---|---|---|
| 1* | −7238.032 | 1.30 | 1.84954 | 40.1 | 15.50 |
| 2* | 7.004 | 2.38 | | | 12.30 |
| 3 | 12.664 | 2.05 | 1.92286 | 18.9 | 12.70 |
| 4 | 28.452 | Variable | | | 12.40 |
| 5 (Stop) | ∞ | 0.00 | | | 7.91 |
| 6 | ∞ | 0.20 | | | 10.00 |
| 7* | 7.272 | 2.70 | 1.76414 | 49.0 | 8.40 |
| 8* | 307.763 | 0.20 | | | 7.80 |
| 9 | 8.423 | 1.60 | 1.88300 | 40.8 | 7.10 |
| 10 | 8.552 | 0.40 | 2.14352 | 17.8 | 6.50 |
| 11 | 4.750 | 3.15 | | | 5.50 |
| 12* | 20.559 | 1.60 | 1.88300 | 40.8 | 6.20 |
| 13* | 405.354 | 0.60 | | | 6.40 |
| 14 | ∞ | Variable | | | 4.90 |
| 15 | 20.352 | 1.80 | 1.60311 | 60.6 | 11.00 |
| 16 | 3086.124 | Variable | | | 11.00 |
| 17 | ∞ | 1.00 | 1.51633 | 64.1 | 15.00 |
| 18 | ∞ | 0.72 | | | 15.00 |
| Image plane | ∞ | | | | |

Aspheric data

1st surface $K = -7.54512e+008$  $A4 = -4.49743e-005$  $A6 = 1.06216e-006$
$A8 = -2.61882e-009$  $A10 = -3.48695e-011$ 2nd surface $K = -2.58403e+000$  $A4 = 6.32275e-004$  $A6 = -7.76044e-006$
$A8 = 1.78744e-007$  $A10 = -1.60280e-009$ 7th surface $K = -3.67173e-001$  $A4 = -1.15919e-004$  $A6 = -5.75992e-007$
$A8 = -1.82951e-008$  $A10 = -3.70363e-010$ 8th surface $K = 8.67739e+002$  $A4 = 4.71782e-006$  $A6 = 8.54371e-007$
$A8 = -1.48366e-008$  $A10 = -8.11189e-010$ 12th surface $K = 6.29157e-001$  $A4 = 1.10227e-005$  $A6 = 2.12241e-006$
$A8 = -5.60447e-007$  $A10 = 5.27399e-008$ 13th surface $K = 4.53415e+002$  $A4 = 1.54792e-005$  $A6 = 3.90558e-007$
$A8 = -6.51412e-007$  $A10 = 5.97840e-008$

Various data
Zoom ratio 3.84

| | Wide angle | Middle | Telephoto |
|---|---|---|---|
| Focal length | 6.14 | 14.83 | 23.55 |
| F-number | 2.06 | 3.61 | 5.17 |
| Angle of view | 33.55 | 17.32 | 11.11 |
| Image height | 4.07 | 4.63 | 4.63 |
| Entire lens length | 45.28 | 41.32 | 47.62 |
| BF | 0.72 | 0.72 | 0.72 |
| d 4 | 18.80 | 4.90 | 1.27 |
| d14 | 2.24 | 12.22 | 22.19 |
| d16 | 4.53 | 4.49 | 4.45 |
| Entrance pupil position | 8.58 | 5.41 | 3.86 |
| Exit pupil position | −20.83 | −55.78 | −272.44 |
| Front-side principal point position | 12.97 | 16.35 | 25.38 |
| Rear-side principal point position | −5.42 | −14.11 | −22.83 |

Zoom lens unit data

| Unit | Starting surface | Focal length | Lens length | Front-side principal point position | Rear-side principal point position |
|---|---|---|---|---|---|
| 1 | 1 | −14.24 | 5.73 | −0.26 | −4.54 |
| 2 | 5 | 12.91 | 10.45 | −0.94 | −8.81 |
| 3 | 15 | 33.96 | 1.80 | −0.01 | −1.13 |
| 4 | 17 | ∞ | 1.00 | 0.33 | −0.33 |

Lens unit data

| Lens | Starting surface | Focal length |
|---|---|---|
| 1 | 1 | −8.24 |
| 2 | 3 | 23.28 |
| 3 | 7 | 9.71 |
| 4 | 9 | 92.70 |
| 5 | 10 | −9.90 |
| 6 | 12 | 24.48 |
| 7 | 15 | 33.96 |
| 8 | 17 | 0.00 |

TABLE 1

| Condition | Example 1 | Example 2 | Example 3 | Example 4 | Example 5 | Example 6 | Example 7 |
|---|---|---|---|---|---|---|---|
| (1) | 1.784 | 1.795 | 1.843 | 1.790 | 1.732 | 1.843 | 1.843 |
| (2) | 2.001 | 2.001 | 2.001 | 2.001 | 1.904 | 2.020 | 2.144 |
| (3) | 1.119 | 1.118 | 1.062 | 1.086 | 1.137 | 1.085 | 1.073 |
| (4) | 0.817 | 0.826 | 0.767 | 0.807 | 1.004 | 0.761 | 0.752 |
| (5) | 1.999 | 2.095 | 2.026 | 1.876 | 1.517 | 2.010 | 2.047 |
| (6) | 3.348 | 3.261 | 3.264 | 3.361 | 3.353 | 3.481 | 3.695 |
| (7) | 1.743 | 1.743 | 1.764 | 1.768 | 1.694 | 1.764 | 1.764 |
| (8) | 1.109 | 1.019 | 1.125 | 0.991 | 1.049 | 1.398 | 3.277 |
| (9) | −1.048 | −1.049 | −1.040 | −1.057 | −1.125 | −1.065 | −1.048 |
| (10) | 0.984 | 0.997 | 0.920 | 0.991 | 0.910 | 0.907 | 0.906 |
| (11) | 2.180 | 2.201 | 2.079 | 2.041 | 2.183 | 2.120 | 2.103 |

Next, a digital camera (image pickup apparatus) in which the zoom lens according to an exemplary embodiment of the invention is used as a photographic optical system will be described with reference to FIG. 15. In FIG. 15, reference numeral 20 denotes a camera body, and reference numeral 21 denotes a photographic optical system including any one of the zoom lenses described in the aforementioned embodiments. Reference numeral 22 denotes an image sensor such as a CCD for receiving an object image formed by the photographic optical system 21. Reference numeral 23 denotes a recording unit that records the object image captured by the image sensor 22. Reference numeral 24 denotes a viewfinder for observing the object image displayed on a display device (not shown).

The aforementioned display device includes a liquid crystal panel and the like, and the object image formed on the image sensor 22 is displayed thereon. In this manner, it is possible to implement a miniaturized image pickup apparatus having high optical performance by applying the zoom lens according to an exemplary embodiment of the invention to an optical apparatus such as a digital camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-114802 filed May 23, 2011, which is hereby incorporated by reference herein in its entirety.

What is claimed is:

1. A zoom lens comprising, in order from an object side to an image side, a first lens unit of a negative refractive power, a second lens unit of a positive refractive power, and a third lens unit of a positive refractive power, each lens unit being moved during zooming, wherein the second lens unit includes two positive lenses, a negative lens, and a positive lens in order from the object side to the image side, and wherein the following conditions are satisfied:

$$1.73 < Nd2p < 1.92,$$

$$1.90 < Nd2n < 2.40, \text{ and}$$

$$1.90 < Dd2/Dd21 < 4.00,$$

where $Nd2p$ denotes an average refractive index for d-line of materials of the positive lenses in the second lens unit, $Nd2n$ denotes a refractive index for d-line of a material of the negative lens in the second lens unit, $Dd2$ denotes a thickness of the second lens unit on an optical axis, and $Dd21$ denotes a thickness of a positive lens closest to the object side of the second lens unit on the optical axis.

2. The zoom lens according to claim 1, wherein the following condition is satisfied:

$$0.15 < f2/\sqrt{(fw \cdot ft)} < 1.15,$$

where $f2$ denotes a focal length of the second lens unit, $fw$ denotes a focal length of the entire zoom lens at a wide-angle end, and $ft$ denotes a focal length of the entire zoom lens at a telephoto end.

3. The zoom lens according to claim 1, wherein the following condition is satisfied:

$$0.75 < f21/f2 < 1.60,$$

where $f2$ denotes a focal length of the second lens unit, and $f21$ denotes a focal length of a positive lens in the second lens unit closest to the object side.

4. The zoom lens according to claim 1, wherein the following condition is satisfied:

$$0.95 < m2/f21 < 2.20,$$

where $f21$ denotes a focal length of a positive lens in the second lens unit closest to the object side, and $m2$ denotes a movement amount in an optical axis direction of the second lens unit during zooming from a wide-angle end to a telephoto end, a sign of the movement amount being positive when the second lens unit moves towards the image side.

5. The zoom lens according to claim 1, wherein the following condition is satisfied:

$$1.65 < Nd2 \min < 1.85,$$

where $Nd2 \min$ denotes a refractive index of a material having the lowest refractive index for d-line out of materials of lenses in the second lens unit.

6. The zoom lens according to claim 1, wherein the following condition is satisfied:

$$0.90 < f2p/f2 < 4.00,$$

where $f2$ denotes a focal length of the second lens unit, and $f2p$ denotes an average focal length of the positive lenses in the second lens unit.

7. The zoom lens according to claim 1, wherein the following condition is satisfied:

$$-1.30 < (R21a + R21b)/(R21a - R21b) < -1.00,$$

where $R21a$ denotes a radius of curvature of an object-side lens surface of a positive lens closest to the object side in the second lens unit, and $R21b$ denotes a radius of curvature of an image-side lens surface thereof.

8. The zoom lens according to claim 1, wherein the following condition is satisfied:

$$0.90 < f2/|f1| < 1.20,$$

where $f1$ denotes a focal length of the first lens unit, and $f2$ denotes a focal length of the second lens unit.

9. The zoom lens according to claim 1, wherein the following condition is satisfied:

$$1.50 < f2/fw < 2.60,$$

where $f2$ denotes a focal length of the second lens unit, and $fw$ denotes a focal length of the entire zoom lens at a wide-angle end.

10. The zoom lens according to claim 1, wherein the first lens unit includes one negative lens and one positive lens.

11. The zoom lens according to claim 1, wherein the third lens unit includes one positive lens.

12. The zoom lens according to claim 1, wherein the zoom lens is configured to form an image on a solid-state image sensor.

13. An image pickup apparatus comprising:

a zoom lens; and a solid-state image sensor configured to receive an image formed by the zoom lens, wherein the zoom lens comprises, in order from an object side to an image side, a first lens unit of a negative refractive power, a second lens unit of a positive refractive power, and a third lens unit of a positive refractive power, each lens unit being moved during zooming, wherein the second lens unit includes two positive lenses, a negative lens, and a positive lens in order from the object side to the image side, and wherein the following conditions are satisfied:

$$1.73 < Nd2p < 1.92,$$

$$1.90 < Nd2n < 2.40, \text{ and}$$

$$1.90 < Dd2/Dd21 < 4.00,$$

where $Nd2p$ denotes an average refractive index for d-line of materials of the positive lenses in the second lens unit, $Nd2n$ denotes a refractive index for d-line of a material of the negative lens in the second lens unit, $Dd2$ denotes a thickness of the second lens unit on an optical axis, and $Dd21$ denotes a thickness of a positive lens closest to the object side of the second lens unit on the optical axis.

14. A zoom lens comprising, in order from an object side to an image side, a first lens unit of a negative refractive power, a second lens unit of a positive refractive power, and a third lens unit of a positive refractive power, each lens unit being moved during zooming, wherein the second lens unit includes two positive lenses, a negative lens, and a positive lens in order from the object side to the image side, and wherein the following conditions are satisfied:

$$1.73 < Nd2p < 1.92,$$

$$1.90 < Nd2n < 2.40, \text{ and}$$

$$1.65 < Nd2 \min < 1.85,$$

where Nd2p denotes an average refractive index for d-line of materials of the positive lenses in the second lens unit, Nd2n denotes a refractive index for d-line of a material of the negative lens in the second lens unit, and Nd2 min denotes a refractive index of a material having the lowest refractive index for d-line out of materials of lenses in the second lens unit.

15. A zoom lens comprising, in order from an object side to an image side, a first lens unit of a negative refractive power, a second lens unit of a positive refractive power, and a third lens unit of a positive refractive power, each lens unit being moved during zooming,
   wherein the second lens unit includes two positive lenses, a negative lens, and a positive lens in order from the object side to the image side, and
   wherein the following conditions are satisfied:

$1.73 < Nd2p < 1.92,$ $1.90 < Nd2n < 2.40,$ and $1.50 < f2/fw < 2.60,$ where Nd2p denotes an average refractive index for d-line of materials of the positive lenses in the second lens unit, Nd2n denotes a refractive index for d-line of a material of the negative lens in the second lens unit, f2 denotes a focal length of the second lens unit, and fw denotes a focal length of the entire zoom lens at a wide-angle end.

16. An image pickup apparatus comprising:
   a zoom lens; and
   a solid-state image sensor configured to receive an image formed by the zoom lens,
   wherein the zoom lens comprises, in order from an object side to an image side:
   a first lens unit of a negative refractive power, a second lens unit of a positive refractive power, and a third lens unit of a positive refractive power, each lens unit being moved during zooming,
   wherein the second lens unit includes two positive lenses, a negative lens, and a positive lens in order from the object side to the image side, and
   wherein the following conditions are satisfied:

$1.73 < Nd2p < 1.92,$ $1.90 < Nd2n < 2.40,$ and $1.65 < Nd2$ min $< 1.85,$ where Nd2p denotes an average refractive index for d-line of materials of the positive lenses in the second lens unit, Nd2n denotes a refractive index for d-line of a material of the negative lens in the second lens unit, and Nd2 min denotes a refractive index of a material having the lowest refractive index for d-line out of materials of lenses in the second lens unit.

17. An image pickup apparatus comprising:
   a zoom lens; and
   a solid-state image sensor configured to receive an image formed by the zoom lens,
   wherein the zoom lens comprises, in order from an object side to an image side:
   a first lens unit of a negative refractive power, a second lens unit of a positive refractive power, and a third lens unit of a positive refractive power, each lens unit being moved during zooming,
   wherein the second lens unit includes two positive lenses, a negative lens, and a positive lens in order from the object side to the image side, and
   wherein the following conditions are satisfied:

$1.73 < Nd2p < 1.92,$ $1.90 < Nd2n < 2.40,$ and $1.50 < f2/fw < 2.60,$ where Nd2p denotes an average refractive index for d-line of materials of the positive lenses in the second lens unit, Nd2n denotes a refractive index for d-line of a material of the negative lens in the second lens unit, and f2 denotes a focal length of the second lens unit, and fw denotes a focal length of the entire zoom lens at a wide-angle end.

* * * * *